US012620398B2

(12) United States Patent
Hyun

(10) Patent No.: US 12,620,398 B2
(45) Date of Patent: May 5, 2026

(54) ELECTRONIC DEVICE STORES TAG INFORMATION OF CONTENT

(71) Applicant: SAMSUNG ELECTRONICS CO., LTD., Suwon-si (KR)

(72) Inventor: Hwakyung Hyun, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 142 days.

(21) Appl. No.: 18/369,031

(22) Filed: Sep. 15, 2023

(65) Prior Publication Data

US 2024/0005928 A1     Jan. 4, 2024

Related U.S. Application Data

(63) Continuation of application No. PCT/KR2022/001445, filed on Jan. 27, 2022.

(30) Foreign Application Priority Data

Mar. 18, 2021     (KR) ........................ 10-2021-0035143

(51) Int. Cl.
*G10L 17/06*              (2013.01)
(52) U.S. Cl.
CPC .................................... *G10L 17/06* (2013.01)
(58) Field of Classification Search
CPC ......... G10L 17/06; G10L 17/00; G06F 16/61; G06F 16/68; G06F 16/686; G11B 20/10
See application file for complete search history.

(56) References Cited

U.S. PATENT DOCUMENTS 6,434,520 B1      8/2002  Kanevsky et al.
2012/0287218 A1  11/2012  Ok
(Continued)

FOREIGN PATENT DOCUMENTS

JP        2019216408 A      12/2019
KR       20120002719 A       1/2012
(Continued)

OTHER PUBLICATIONS

International Search Report and Written Opinion for International Application No. PCT/KR2022/001445; International Filing Date Jan. 27, 2022; Date of Mailing May 11, 2022; 10 Pages.
(Continued)

*Primary Examiner* — Huyen X Vo
(74) *Attorney, Agent, or Firm* — CANTOR COLBURN LLP

(57)                    ABSTRACT

An electronic device according to an embodiment comprises a memory, a display, and a processor operatively connected to the memory and the display, wherein the processor may be configured to: collect speech data; match the collected speech data with user information related to the collected speech data and store, in the memory, association information between the collected speech data and the user information; when generating content, detect speech data of the content input that is input during generation of the content; and when there is user information matching with the detected speech data in the memory, store the user information matching with the detected speech data of the content as tag information of the content.

13 Claims, 19 Drawing Sheets

600d

(56)                References Cited

U.S. PATENT DOCUMENTS

| | | |
|---|---|---|
| 2018/0158464 A1 | 6/2018 | Sidi et al. |
| 2018/0174587 A1* | 6/2018 | Bermundo ............ G06F 3/1271 |
| 2018/0190296 A1 | 7/2018 | Williams et al. |
| 2018/0277122 A1 | 9/2018 | Li et al. |
| 2018/0342251 A1* | 11/2018 | Cohen ................... G06V 40/70 |
| 2019/0026559 A1 | 1/2019 | Zhan et al. |
| 2019/0156835 A1* | 5/2019 | Church .................. G10L 15/30 |
| 2019/0362724 A1 | 11/2019 | Wang et al. |
| 2019/0379941 A1 | 12/2019 | Hou et al. |
| 2020/0059552 A1 | 2/2020 | Kim et al. |
| 2020/0380976 A1 | 12/2020 | Lee et al. |

FOREIGN PATENT DOCUMENTS

| | | |
|---|---|---|
| KR | 20120126531 A | 11/2012 |
| KR | 20130063742 A | 6/2013 |
| KR | 20140065214 A | 5/2014 |
| KR | 20190142192 A | 12/2019 |
| KR | 20210010594 A | 1/2021 |
| WO | 2019146942 A1 | 8/2019 |

OTHER PUBLICATIONS

Korean Office Action Issued In KR Application No. 10-2021-0035143; Mail Date Mar. 4, 2026; 13 Pages.

* cited by examiner

700b

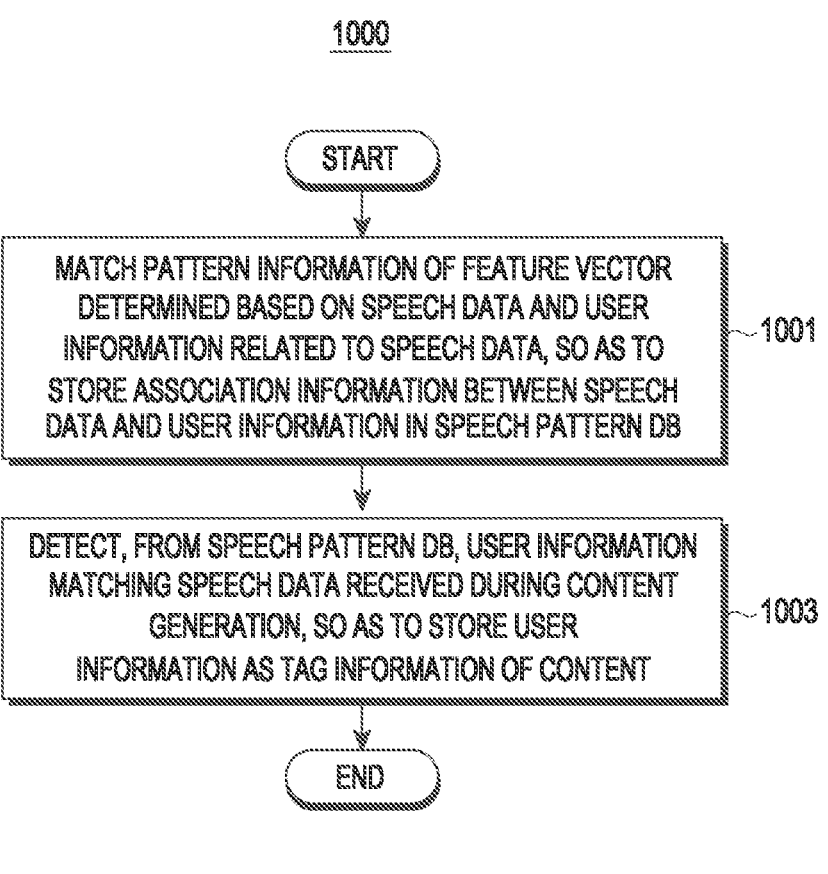

1000

START

MATCH PATTERN INFORMATION OF FEATURE VECTOR DETERMINED BASED ON SPEECH DATA AND USER INFORMATION RELATED TO SPEECH DATA, SO AS TO STORE ASSOCIATION INFORMATION BETWEEN SPEECH DATA AND USER INFORMATION IN SPEECH PATTERN DB ~1001

DETECT, FROM SPEECH PATTERN DB, USER INFORMATION MATCHING SPEECH DATA RECEIVED DURING CONTENT GENERATION, SO AS TO STORE USER INFORMATION AS TAG INFORMATION OF CONTENT ~1003

END

FIG. 10

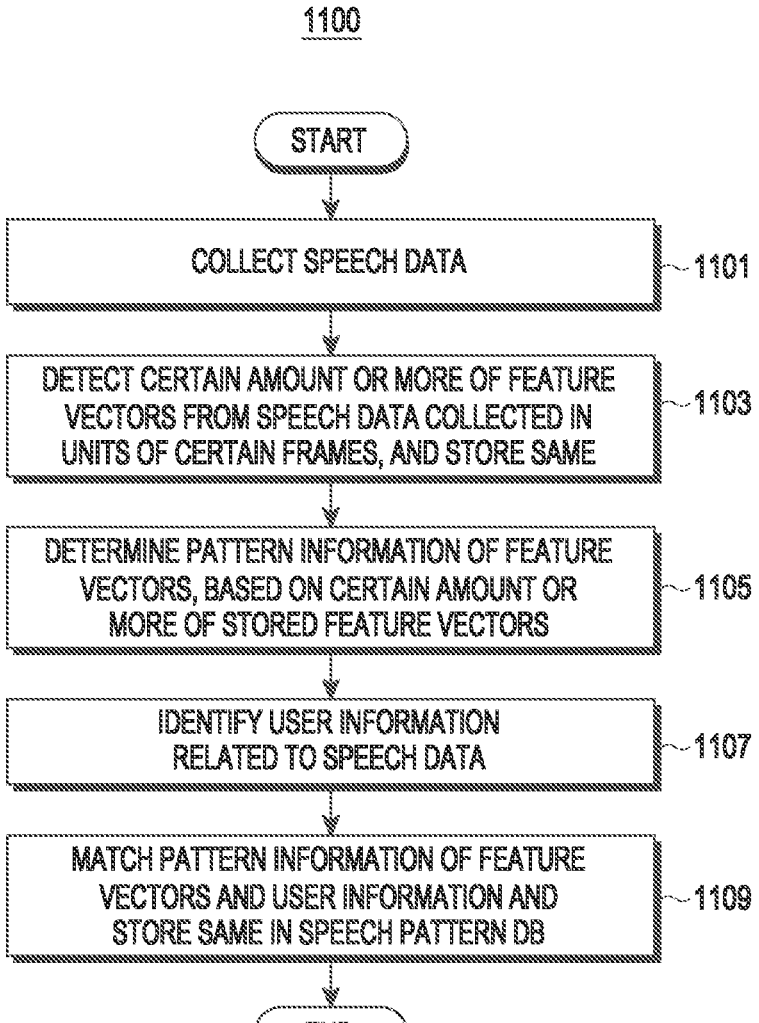

1100

START

COLLECT SPEECH DATA ~1101

DETECT CERTAIN AMOUNT OR MORE OF FEATURE VECTORS FROM SPEECH DATA COLLECTED IN UNITS OF CERTAIN FRAMES, AND STORE SAME ~1103

DETERMINE PATTERN INFORMATION OF FEATURE VECTORS, BASED ON CERTAIN AMOUNT OR MORE OF STORED FEATURE VECTORS ~1105

IDENTIFY USER INFORMATION RELATED TO SPEECH DATA ~1107

MATCH PATTERN INFORMATION OF FEATURE VECTORS AND USER INFORMATION AND STORE SAME IN SPEECH PATTERN DB ~1109

END

FIG. 11

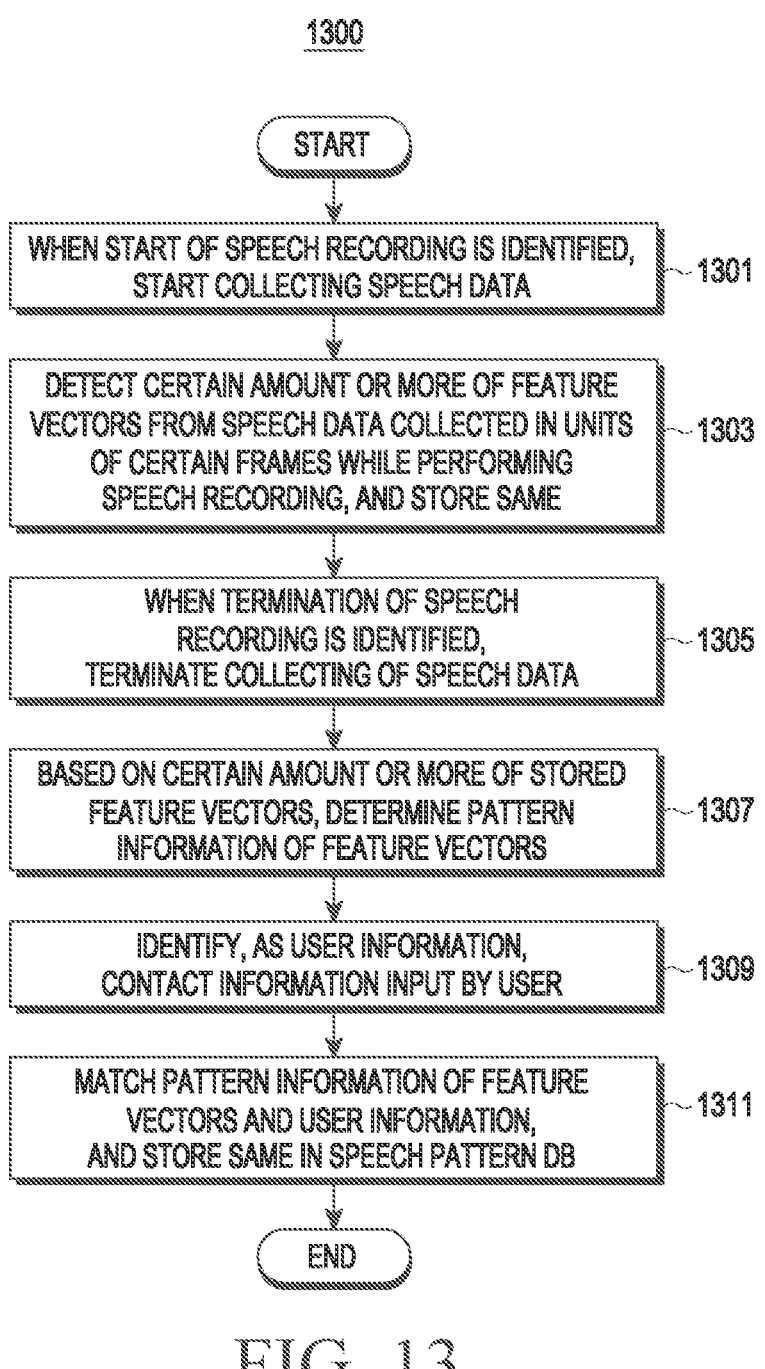

1300

START

WHEN START OF SPEECH RECORDING IS IDENTIFIED,
START COLLECTING SPEECH DATA — 1301

DETECT CERTAIN AMOUNT OR MORE OF FEATURE
VECTORS FROM SPEECH DATA COLLECTED IN UNITS
OF CERTAIN FRAMES WHILE PERFORMING
SPEECH RECORDING, AND STORE SAME — 1303

WHEN TERMINATION OF SPEECH
RECORDING IS IDENTIFIED,
TERMINATE COLLECTING OF SPEECH DATA — 1305

BASED ON CERTAIN AMOUNT OR MORE OF STORED
FEATURE VECTORS, DETERMINE PATTERN
INFORMATION OF FEATURE VECTORS — 1307

IDENTIFY, AS USER INFORMATION,
CONTACT INFORMATION INPUT BY USER — 1309

MATCH PATTERN INFORMATION OF FEATURE
VECTORS AND USER INFORMATION,
AND STORE SAME IN SPEECH PATTERN DB — 1311

END

FIG. 13

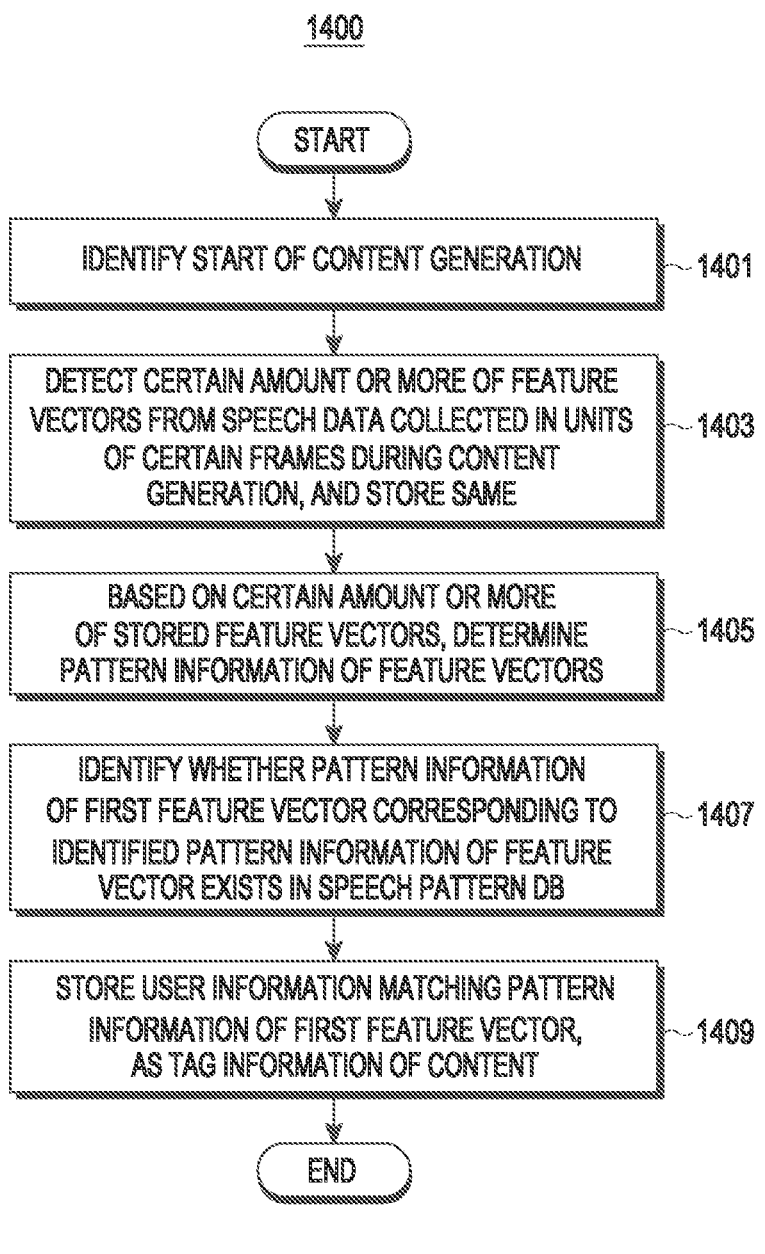

1400

START

IDENTIFY START OF CONTENT GENERATION ~ 1401

DETECT CERTAIN AMOUNT OR MORE OF FEATURE VECTORS FROM SPEECH DATA COLLECTED IN UNITS OF CERTAIN FRAMES DURING CONTENT GENERATION, AND STORE SAME ~ 1403

BASED ON CERTAIN AMOUNT OR MORE OF STORED FEATURE VECTORS, DETERMINE PATTERN INFORMATION OF FEATURE VECTORS ~ 1405

IDENTIFY WHETHER PATTERN INFORMATION OF FIRST FEATURE VECTOR CORRESPONDING TO IDENTIFIED PATTERN INFORMATION OF FEATURE VECTOR EXISTS IN SPEECH PATTERN DB ~ 1407

STORE USER INFORMATION MATCHING PATTERN INFORMATION OF FIRST FEATURE VECTOR, AS TAG INFORMATION OF CONTENT ~ 1409

END

START

IDENTIFY START OF CONTENT REPRODUCTION ~1501

DISPLAY USER INFORMATION STORED AS TAG INFORMATION, IN SPEECH DATA OUTPUT SECTION DURING CONTENT REPRODUCTION ~1503

END

ELECTRONIC DEVICE STORES TAG INFORMATION OF CONTENT

CROSS-REFERENCE TO RELATED APPLICATIONS

This application is a continuation application, claiming priority under § 365(c), of International Application No. PCT/KR2022/001445 filed on Jan. 27, 2022, which is based on and claims the benefit of Korean patent application number 10-2021-0035143 filed on Mar. 18, 2021, in the Korean Intellectual Property Office, the disclosures of which are incorporated by reference herein in their entireties.

TECHNICAL FIELD

An embodiment relate to an electronic device and a method for storing tag information of content in the electronic device.

BACKGROUND ART

An electronic device has a function of inputting and managing a content tag. A desired tag may be selected or directly input and added to content, and then, contents may be filtered and provided for each tag.

DETAILED DESCRIPTION OF THE INVENTION

Technical Problem

Although there is a function to input and manage tags for contents, such as photos and videos, tags are manually input via a complicated procedure. For example, in order to add a person tag to a video, there is discomfort (including extra steps and time) that a user should first play the video to identify information of a person included in the video, and then enter a detailed information editing menu to save the tag for the person information by a manual input.

Technical Solution

According to one or more embodiments, an electronic device capable of storing person tag information in content by using speech data, and a method for storing tag information of content in the electronic device are provided.

An electronic device according to an embodiment may include a memory, a display, and a processor operatively connected to the memory and the display, wherein the processor is configured to collect speech data, match the collected speech data and user information related to the collected speech data, store, in the memory, association information between the collected speech data and the user information, detect, when generating content, speech data of the content that is input during generation of the content, and obtain user information matching with the detected speech data of the content from the memory, store the user information matching with the detected speech data of the content, as tag information of the content.

A method for storing tag information of content in an electronic device according to an embodiment may include collecting speech data, matching the collected speech data and user information related to the collected speech data, storing, in a memory of the electronic device, association information between the collected speech data and the user information, detecting, when generating content, speech data of the content that is input during generation of the content, and obtaining user information matching with the detected speech data of the content from in the memory, storing the user information matching with the detected speech data of the content, as tag information of the content.

Advantageous Effects

According to an embodiment, a person tag may be automatically stored in content.

According to an embodiment, content can be classified based on speech data, and therefore utilization can be increased in, for example, video playlists, social network (SNS) sharing, and scenario editing and processing.

According to an embodiment, in the case of a video in which a person tag is stored based on speech data, since it is possible to know when speech of a specific person is output and when the output is stopped automatically, editing can be facilitated using a section where the speech of the specific person is output.

According to an embodiment, a person tag can be stored in real time not only in a video but also in various contents, such as a voice memo enabling speech recording and an image received from a home surveillance camera.

BRIEF DESCRIPTION OF DRAWINGS

FIG. 10 is a flowchart illustrating an operation of storing tag information of content in an electronic device according to an embodiment;

FIG. 11 is a flowchart illustrating an operation of matching and storing user information, based on speech data in an electronic device according to an embodiment;

FIG. 13 is a flowchart illustrating an operation of collecting speech data for performing speech recording in an electronic device according to an embodiment;

FIG. 14 is a flowchart illustrating an operation of generating tag information of content in an electronic device according to an embodiment.

MODE FOR CARRYING OUT THE INVENTION

Figure 1:
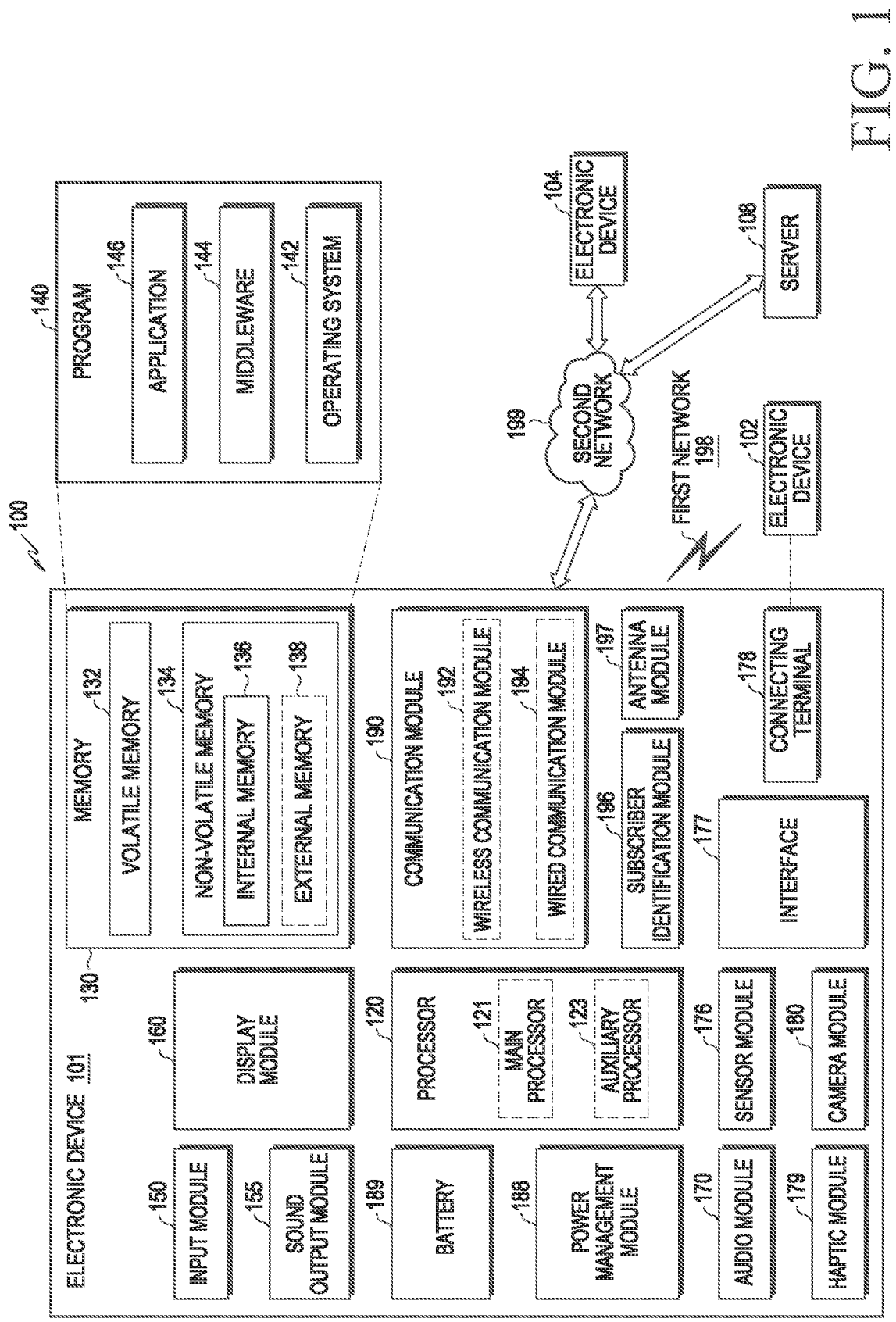
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
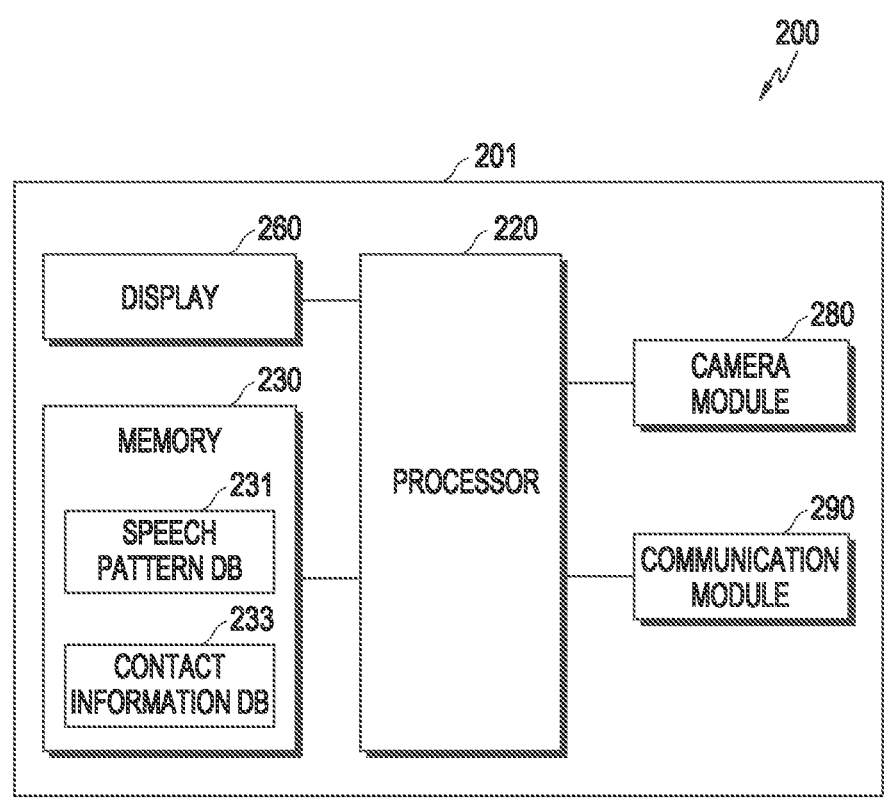
FIG. 2 is a block diagram illustrating an electronic device according to an embodiment.

FIG. 2 is a block diagram 200 of an electronic device according to an embodiment.

Referring to FIG. 2, an electronic device 201 (e.g., the electronic device 101 of FIG. 1) may include a processor 220, a memory 230, a display 260, a camera module 280, and a communication module 290.

According to an embodiment, the processor 220 may control the overall operation of the electronic device 201, and may be the same as the processor 120 of FIG. 1 or may perform at least one function or operation performed by the processor 120.

According to an embodiment, the processor 220 may match pattern information of a feature vector determined based on speech data with user information related to the speech data, and store, in the memory 230, association information between the speech data and the user.

According to an embodiment, the processor 220 may store the speech data and the user information matching with the speech data in a speech pattern DB 231 of the memory 230.

According to an embodiment, the processor 220 may store, in the speech pattern DB 231, index information enabling detection of the user information stored in a contact information DB 233 and the speech data.

According to an embodiment, the processor 220 may collect speech data in frames of a certain unit for a certain time, and detect a certain amount or more of feature vectors from the collected speech data so as to store the same in the memory 230.

According to an embodiment, the processor 220 may collect speech data during a call, and detect the certain amount or more of the feature vectors from the collected certain amount of speech data so as to store the same in the memory 230.

According to an embodiment, when speech data is collected during a call, the processor 220 may collect the data while changing a buffer size or/and a data request period according to a call environment or a call type. A call may be made in various forms according to at least one of a network state, use of a specific application, a video call, and/or a voice call. A call may be made in various forms, such as a call using various network states including 3G, LTE, or 5G, or a call using VoLTE, and information of speech data used may vary depending on the call environment. For example, in an LTE network, a call is made at a sampling rate of 16 kilohertz (KHz) by using an adaptive multi-rate wideband (AMR-WB) codec, and in the case of VoLTE, a codec, such as AMR or advanced audio coding (AAC), is used depending on an application used, and a call is also made at various schemes of sampling rates from 8 KHz to 48 KHz. Therefore, differences may occur in collected speech data, so that, for speech data collection, speech data may be collected while changing at least one of a buffer size and/or a data request period according to a call type.

According to an embodiment, when the processor 220 collects speech data during a call, since the collected speech data has different characteristics depending on a call type, preprocessing may be performed differently for each codec so that all data may have the same characteristics. For example, for the AMR codec, since a sampling rate is low, the processor 220 may detect a feature vector after re-sampling to a target frequency. For example, for the AAC codec, since a sampling rate is relatively high, the feature vector may be detected using only a high frequency band before performing re-sampling.

According to an embodiment, when speech data is collected during a video call, the processor 220 may collect face image information of a user and the speech data so as to store the same in the memory 230.

According to an embodiment, the processor 220 may collect speech data while executing a speech recording application and storing the speech data, and detect the certain amount or more of the feature vectors from the collected certain amount of speech data so as to store the same in the memory 230.

According to an embodiment, the processor 220 may collect speech data while reproducing content including the speech data, and detect the certain amount or more of the feature vectors from the collected certain amount of speech data so as to store the same in the memory 230.

According to an embodiment, the feature vector is a feature that may be detected in an audio signal and may be a numerical value representing a unique characteristic of sound. The feature vector may include a feature vector indicating timbre information and a feature vector indicating pitch information. For example, the feature vector indicating timbre information may include MelSpectrogram or mel-frequency cepstral coefficients (MFCC). For example, the feature vector indicating pitch information may include chroma.

According to an embodiment, the processor 220 may determine, based on the certain amount or more of the feature vectors stored in the memory 230, pattern information of the feature vectors. The processor 220 may detect respective dimension-specific (e.g., frequency band-specific) statistical values of a certain amount or more of feature vectors detected from speech data collected for a certain time so as to be stored, and may determine the detected statistical values as pattern information of the feature vectors. The statistical values may include a mean and/or a variance.

According to an embodiment, the processor 220 may generate a model capable of learning the pattern information of the feature vectors determined based on the certain amount or more of the feature vectors stored in the memory 230.

According to an embodiment, the processor 220 may generate a model using a neural network and a model using a statistical distribution, and may input the pattern information of the feature vectors to the models for training. For example, the model using a statistical distribution may include a Gaussian mixture model-universal background model (GMM-UBM).

distribution of the certain amount or more of the stored feature vectors is not close to the normal distribution, the processor 220 may configure the confidence level value to be equal to or smaller than a certain value.

According to an embodiment, for the pattern information of the feature vectors, in which the confidence level value is configured to be equal to or smaller than the certain value in the speech pattern DB 231, if a confidence level value for new pattern information of feature vectors having the same user information is determined to be a value equal to or greater than the certain value, the processor 220 may delete the existing pattern information of the feature vectors and confidence level value, and may perform updating with the new pattern information of the feature vectors and confidence level value.

According to an embodiment, if the distribution of the certain amount or more of the stored feature vectors is equal to or higher than a certain level close to the normal distribution, the processor 220 may store the pattern information of the feature vectors in the speech pattern DB 231, and if the distribution of the certain amount or more of the stored feature vectors is equal to or lower than the certain level that is not close to the normal distribution, the processor 220 may not store the pattern information of the feature vectors in the speech pattern DB 231.

According to an embodiment, the processor 220 may store user information, feature vector pattern information, and confidence level values in the speech pattern DB 231 as shown in <Table 1> below.

TABLE 1

| Name | Nick | Group | MFCC | | | | | | | Chroma | | | Confidence |
|------|------|-------|------|------|------|------|------|------|------|--------|------|------|------------|
| Mom | | Family | 0.839 | 0.471 | 0.236 | 0.103 | ... | 0.001 | 0.014 | 0.903 | ... | 0.006 | 0.98 |
| Jason | J | Friend | 0.752 | 0.733 | 0.211 | 0.224 | ... | 0.176 | 0.002 | 0.007 | ... | 0.911 | 0.98 |
| Emma | SKY | Friend | 0.903 | 0.512 | 0.519 | 0.092 | ... | 0.028 | 0.891 | 0.03 | ... | 0.370 | 0.98 |

According to an embodiment, when the pattern information of the feature vectors is determined, the processor 220 may match the determined pattern information of the feature vectors and user information related to the collected speech data so as to store association information between the speech data and the user information in the speech pattern DB 231 of the memory 230.

According to an embodiment, when the pattern information of the feature vectors is determined based on the speech data collected during a call, the processor 220 may identify information of a counterpart having made the call, based on contact information stored in the contact information DB 233, and may determine the identified counterpart information to be the user information related to the speech data.

According to an embodiment, when the pattern information of the feature vectors is determined based on the speech data collected during speech recording or content reproduction, the processor 220 may determine contact information input by a user to be the user information related to the speech data.

According to an embodiment, the processor 220 may determine a confidence level for the pattern information of the feature vectors according to the distribution of the certain amount or more of the feature vectors stored in the memory 230. When the distribution of the certain amount or more of the stored feature vectors is close to a normal distribution, the processor 220 may configure a confidence level value to be a certain value or greater, and if the In <Table 1>, the user information may include a name, a nickname (nick), and a group, and the feature vectors may include mel-frequency cepstral coefficients (MFCC) that is a feature vector indicating timbre information and chroma that is a feature vector indicating pitch information. The pattern information of the feature vectors may indicate detected statistical values which are respective dimension-specific (e.g., frequency band-specific) statistical values of the certain amount or more of feature vectors detected from the speech data collected for a certain time so as to be stored. The statistical values may include a mean and/or a variance.

According to an embodiment, the processor 220 may store all of a name, a nickname (nick), and a group as the user information as shown in <Table 1>, or may store at least one of a name, a nickname (nick), and a group as the user information in the speech pattern DB 231, based on a user's selection or designated priority.

According to an embodiment, in consideration of storage capacity of the speech pattern DB 231, the processor 220 may store index information of a contact information DB 233, which enables detection of a name, a nickname (nick), and/or a group from the contact information DB 233, instead of storing, as the user information, a name, a nickname (nick), and/or a group in the speech pattern DB 231.

According to an embodiment, the processor 220 may detect, in the memory 230, user information matching with speech data received while generating content, and store the user information as tag information of the content.

According to an embodiment, the processor 220 may collect data input to a microphone of the electronic device while generating the content.

According to an embodiment, the processor 220 may detect a certain amount of feature vectors from speech data received in a certain time unit during generation of the content so as to store the same in the memory 230. The processor 220 may detect respective dimension-specific (e.g., frequency band-specific) statistical values of the certain amount or more of the stored feature vectors, and may identify the detected statistical values as pattern information of the feature vectors. The statistical values may include a mean and/or a variance.

According to an embodiment, the processor 220 may input the pattern information of the feature vectors to a model using a neural network and a model using a statistical distribution, so as to detect user information matching with pattern information of a first feature vector from the speech pattern DB 231 of the memory 230. If results of the model using the neural network and the model using the statistical distribution are different, the processor 220 may determine a result by adding a weight to the result of the model using the neural network.

According to an embodiment, the processor 220 may identify the pattern information of the feature vectors, based on the certain amount or more of the stored feature vectors, and may identify the presence of the pattern information of the first feature vector, in which a similarity to the identified pattern information of the feature vectors is equal to or greater than a certain reference value, in the pattern information of the feature vectors stored in the speech pattern DB 231 of the memory 230. The processor 220 may detect user information matching with the pattern information of the first feature vector, and store the detected user information as tag information of the content.

According to an embodiment, the processor 220 may store the user information matching with the pattern information of the first feature vector, as tag information of a section in the content, where the speech data is received.

According to an embodiment, the processor 220 may determine a confidence level of the identified pattern information of the feature vectors, based on the distribution of the certain amount or more of the stored feature vectors, and if the confidence level is equal to or higher than a certain level, the processor 220 may identify the presence of the pattern information of the first feature vector, in which the similarity to the identified pattern information of the feature vectors is equal to or greater than the certain reference value, in the speech pattern DB 231.

According to an embodiment, if the pattern information of the first feature vector, in which the similarity to the identified pattern information of the feature vectors is equal to or greater than the certain reference value, does not exist in the speech pattern DB 231, the processor 220 may request a speech pattern DB from at least one external electronic device related to the electronic device. For example, the processor 220 may request a speech pattern DB from at least one external electronic device existing on the same network as the electronic device 201 or at least one external electronic device registered with the same account as the electronic device 201. The processor 220 may identify whether the pattern information of the first feature vector, in which the similarity to the identified pattern information of the feature vectors is equal to or greater than the certain reference value, exists in the speech pattern DB received from the at least one external electronic device.

According to an embodiment, the pattern information of the first feature vector, in which the similarity to the identified pattern information of the feature vectors is equal to or greater than the certain reference value, exists in the speech pattern DB 231, but if a confidence level value of the pattern information of the first feature vector is equal to or lower than the certain value, the processor 220 may request a speech pattern DB from at least one external electronic device related to the electronic device. If the confidence level value of the pattern information of the first feature vector is identified to be equal to or greater than the certain value in the speech pattern DB received from the at least one external electronic device, the processor 220 may update the speech pattern DB 231 of the electronic device, based on the speech pattern DB received from the at least one external electronic device.

According to an embodiment, if the identified pattern information of the feature vectors has the similarity to the pattern information of the first feature vector, the similarity being maintained equal to or greater than the certain reference value for a certain time, the processor 220 may detect user information matching with the pattern information of the first feature vector in the speech pattern DB 231, and may store the detected user information as tag information of the content.

According to an embodiment, the processor 220 may share at least a part of the speech pattern DB with at least one external electronic device related to the electronic device 201.

According to an embodiment, when sharing of the speech pattern DB 231 of the electronic device 201 is requested from the at least one external electronic device existing on the same network as the electronic device 201 or at least one external electronic device registered with the same account as the electronic device 201, the processor 220 may share at least a part of the speech pattern DB 231 of the electronic device 210 with the at least one external electronic device. For example, the at least one external electronic device requesting to share the speech pattern DB 231 of the electronic device 201 may include a wearable electronic device (e.g., a smart watch and AR glasses), an IoT electronic device (e.g., an IoT camera, a smart doorbell, and an AI speaker), or/and a home appliance (e.g., TV).

According to an embodiment, if no speech pattern DB exists in the memory 230, the processor 220 may request a speech pattern DB from at least one external electronic device related to the electronic device 201.

According to an embodiment, when generating content, if no speech pattern DB exists in the memory 230, the processor 220 may request a speech pattern DB from at least one external electronic device existing on the same network as the electronic device 201 or at least one external electronic device registered with the same account as the electronic device 201. When at least a part of the speech pattern DB 231 is received from the at least one external electronic device, the electronic device may store user information related to the speech data received, as tag information of the content, while generating the content by using the received speech pattern DB.

According to an embodiment, the processor 220 may compare the speech pattern DB 231 of the electronic device 201 with the speech pattern DB of at least one external electronic device related to the electronic device, thereby performing update.

According to an embodiment, when the speech pattern DB 231 of the electronic device 201 or the speech pattern DB of the at least one external electronic device is newly generated or updated, the processor 220 may update the speech pattern DBs while comparing the speech pattern DBs of each other.

According to an embodiment, when content, such as an image without speech data, is generated, the processor 220 may detect user information matching with face image information of the user from the speech pattern DB, so as to store the user information as tag information of the content.

According to an embodiment, the processor 220 may display tag information existing in a section in which speech data is output, while content is being reproduced.

According to an embodiment, while displaying of multiple contents stored in the memory 230, the processor 220 may notify that user information (e.g., person tag information) stored as tag information exists in at least one content in which the user information (e.g., person tag information) stored as tag information exists.

According to an embodiment, when user information stored as tag information is stored in content selected by a user from among multiple contents stored in the memory 230, the processor 220 may notify that the user information (e.g., person tag information) stored as tag information exists in the content selected by the user.

According to an embodiment, while reproducing of the content, if the user information (e.g., person tag information) stored as tag information exists in a section in which speech data is output, the processor 220 may display the user information (e.g., person tag information) stored as tag information in a partial area (e.g., a playback bar) of the display 260 displaying the content reproduction.

According to an embodiment, while displaying or reproducing of the content, the processor 220 may perform a search or editing function by using the tag information existing in the output section of speech data.

According to an embodiment, if a search for first user information among at least one piece of user information (e.g., person tag information) stored as tag information in the content is requested while displaying or reproducing the content, the processor 220 may detect output sections of at least one piece of speech data, in which the first user information is stored as tag information, and may reproduce the content while moving to the detected output sections of the speech data.

According to an embodiment, if editing of output sections of at least one piece of speech data, in which the first user information among at least one piece of user information (e.g., person tag information) stored as tag information in the content is stored as tag information, is requested while displaying or reproducing the content, the processor 220 may detect the output sections of at least one piece of speech data, in which the first user information is stored as tag information, and may provide a function to edit the detected output sections of the speech data.

According to an embodiment, a memory 230 may be implemented substantially the same as or similar to the memory 130 of FIG. 1.

According to an embodiment, the memory 230 may include pattern information of the feature vector determined based on speech data, user information (e.g., contact information) related to the speech data, the speech pattern DB 231 storing confidence level values, and the contact information DB 233 storing contact information.

According to an embodiment, the memory 230 may include pattern information of the feature vector determined based on speech data, index information of the contact information DB 233, which enables detection of user information (e.g., contact information) related to the speech data, and the contact information DB 233 storing contact information of the speech pattern DB 231 in which confidence level values are stored.

According to an embodiment, the display 260 may be implemented substantially the same as or similar to the display module 160 of FIG. 1.

According to an embodiment, the display 260 may display, while displaying of multiple contents, the presence of user information (e.g., person tag information) stored as tag information in at least one content, in which the user information (e.g., person tag information) stored as tag information is stored.

According to an embodiment, while reproducing of the content, if the user information (e.g., person tag information) stored as tag information exists in a section in which speech data is output, the display 260 may display the user information (e.g., person tag information) stored as tag information in a partial area (e.g., a playback bar) displaying the content reproduction.

According to an embodiment, the camera module 280 may be implemented substantially the same as or similar to the camera module 280 of FIG. 1.

According to an embodiment, the communication module 290 may be implemented substantially the same as or similar to the communication module 190 of FIG. 1, and may include multiple communication circuits using different communication technologies.

According to an embodiment, the communication module 290 may include at least one of a wireless LAN module (not illustrated) and a short-distance communication module (not illustrated), and may include, as the short-range communication module (not illustrated), an ultra-wide-band (UWB) communication module, a Wi-Fi communication module, an NFC communication module, a Bluetooth legacy communication module, and/or a BLE communication module.

According to an embodiment, the communication module 290 may transmit the speech pattern DB 231 of the memory 230 to at least one external electronic device or receive a speech pattern DB from at least one external electronic device.

Figure 3:
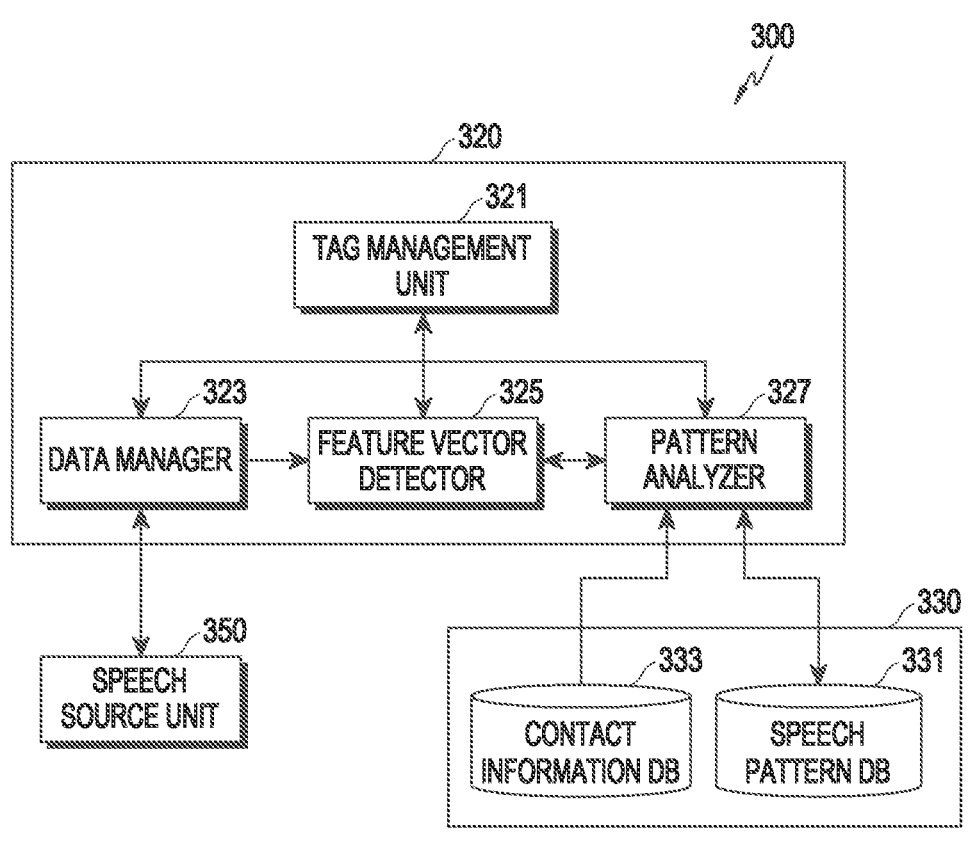
FIG. 3 is a block diagram illustrating a tag management module for storing tag information in content in an electronic device according to an embodiment.

FIG. 3 is a block diagram 300 illustrating a tag management module for storing tag information in content in an electronic device according to an embodiment.

Referring to FIG. 3, a tag management module 320 may include a tag manager 321, a data manager 323, a feature vector detector 325, and a pattern analyzer 327.

According to an embodiment, the tag management module 320 may operate under a control of a processor (e.g., the processor 120 of FIG. 1 and/or the processor 220 of FIG. 2). For example, the tag management module 320 may be configured as a software module including at least one instruction so as to be executed by the processor 120.

According to an embodiment, the tag management module 320 may represent a processor (e.g., the processor 120 of FIG. 1 and/or the processor 220 of FIG. 2). For example, hereinafter, an operation of the tag management module 320 may be understood as an operation of the processor 120.

According to an embodiment, the tag manager 321 may control the data manager 323, the feature vector detector 325, and the pattern analyzer 327 included in the tag management module, and may match pattern information of a feature vector detected based on speech data and user information related to the speech data so as to store the same in a speech pattern DB 331.

According to an embodiment, the tag manager 321 may request the data manager 323 to collect speech data at a time point of collecting speech data, and may request the data manager 323 to terminate collecting of speech data at a time point of terminating speech data.

For example, when an event notifying of a start of a call is received from a call application, the tag manager 321 may request the data manager 323 to collect speech data and may request the data manager 323 to terminate collecting speech data when an event notifying of call termination is received from the call application.

For example, when an event notifying of a start of speech recording is received from a speech recording application, the tag manager 321 may request the data manager 323 to collect speech data and may request the data manager 323 to terminate collecting of speech data when an event notifying of speech recording termination is received from the call application.

According to an embodiment, the tag manager 321 may request, at a termination time point of collecting the speech data, the feature vector detector 325 to detect a feature vector from the collected certain amount of speech data transferred from the data manager 323.

According to an embodiment, when a notification that detection of the feature vector has been completed is received from the feature vector detector 325, the tag manager 321 may request the pattern analyzer 327 to determine pattern information of the feature vector, based on the feature vector transferred from the feature vector detector 325.

According to an embodiment, when a notification that the pattern information of the feature vector has been determined is received from the feature vector analyzer 327, the tag manager 321 may transmit user information related to the collected speech data to the pattern analyzer 327 so that the user information related to the speech data and the pattern information of the feature vector are matched so as to be stored in the speech pattern DB 331 (e.g., the speech pattern DB 231 of FIG. 2).

For example, when speech data is collected during a call, the tag manager 321 may identify information of a counterpart making a call, from contact information stored in a contact information DB 333 (e.g., the contact information DB 233 of FIG. 2), and may transmit the identified counterpart information as user information related to the speech data to the pattern analyzer 327.

For example, when speech data is collected during speech recording, the tag manager 321 may transmit contact information, which is input by a user, as user information related to the speech data to the pattern analyzer 327.

According to an embodiment, the tag manager 321 may control the data manager 323, the feature vector detector 325, and the pattern analyzer 327 included in the tag management module, and may detect, in the speech pattern DB 231, user information matching with the received speech data while content is being generated, so as to store the user information as tag information of the content.

According to an embodiment, the tag manager 321 may request the data manager 323 to collect a certain amount of speech data in each certain time unit while content is being generated.

According to an embodiment, the tag manager 321 may request the feature vector detector 325 to detect a feature vector from the certain amount of speech data transferred from the data manager 323.

According to an embodiment, when a notification that detection of the feature vector has been completed is received from the feature vector detector 325, the tag manager 321 may request the pattern analyzer 327 to determine pattern information of the feature vector, based on the feature vector transferred from the feature vector detector 325.

According to an embodiment, when a request for collecting speech data is received from the tag manager 321, the data manager 323 may collect speech data.

According to an embodiment, when a request for collecting speech data is received from the tag manager 321, the data manager 323 may request speech data from a speech source unit 350 that receives the speech data, and collect the speech data received from the speech source unit 350.

According to an embodiment, when a request to terminate collecting speech data is transferred from the tag manager 321, the data manager 323 may terminate collecting of speech data and transfer the collected speech data to the feature vector detector 325.

When a request for collecting a certain amount of speech data in each certain time unit while content is being generated is received from the tag manager 321, the data manager 323 may transfer the certain amount of speech data collected in each certain time unit to the feature vector detector 325.

According to an embodiment, the feature vector detector 325 may detect a feature vector from the speech data in response to the request of the tag manager 321.

According to an embodiment, when a request for detecting a feature vector is received from the tag manager 321, the feature vector detector 325 may detect a feature vector from the collected certain amount of speech data transferred from the data manager 323.

According to an embodiment, when detection of the feature vector from the collected certain amount of speech data is completed, the feature vector detector 325 may transmit a notification of the completion of the feature vector detection to the tag manager 321, and transmit the detected feature vector to the pattern analyzer 327.

According to an embodiment, the pattern analyzer 327 may determine, based on the feature vector, pattern information of the feature vector in response to the request of the tag manager 321.

According to an embodiment, when a request for determining, based on the feature vector, pattern information of the feature vector is received from the tag manager 321, the pattern analyzer 327 may determine the pattern information of the feature vector, based on processing of outliers and statistical analysis of the feature vector received from the feature vector detector 325, and may perform training by applying the pattern information of the feature vectors to a model.

According to an embodiment, when the pattern information of the feature vectors is determined, the pattern analyzer 327 may transfer, to the tag manager 321, a notification that the pattern information of the feature vectors has been determined, and when user information related to the speech data is received from the tag manager 321, the user information may be matched with the pattern information of the feature vectors so as to be stored in the speech pattern DB 331 (e.g., the speech pattern DB 231 of FIG. 2).

According to an embodiment, when a request for determining, based on the feature vector, pattern information of the feature vector is received from the tag manager 321, the pattern analyzer 327 may determine the pattern information of the feature vector, based on processing of outliers and statistical analysis of the feature vector received from the feature vector detector 325, and may identify, by applying the pattern information of the feature vectors to a model, the presence of pattern information of the first feature vector, in which a similarity to the determined pattern information of the feature vector is equal to or greater than a certain reference value, in the pattern information of the feature vector stored in the speech pattern DB 331. The pattern analyzer 327 may store user information matching with the pattern information of the first feature vector, as tag information of content.

Figure 4:
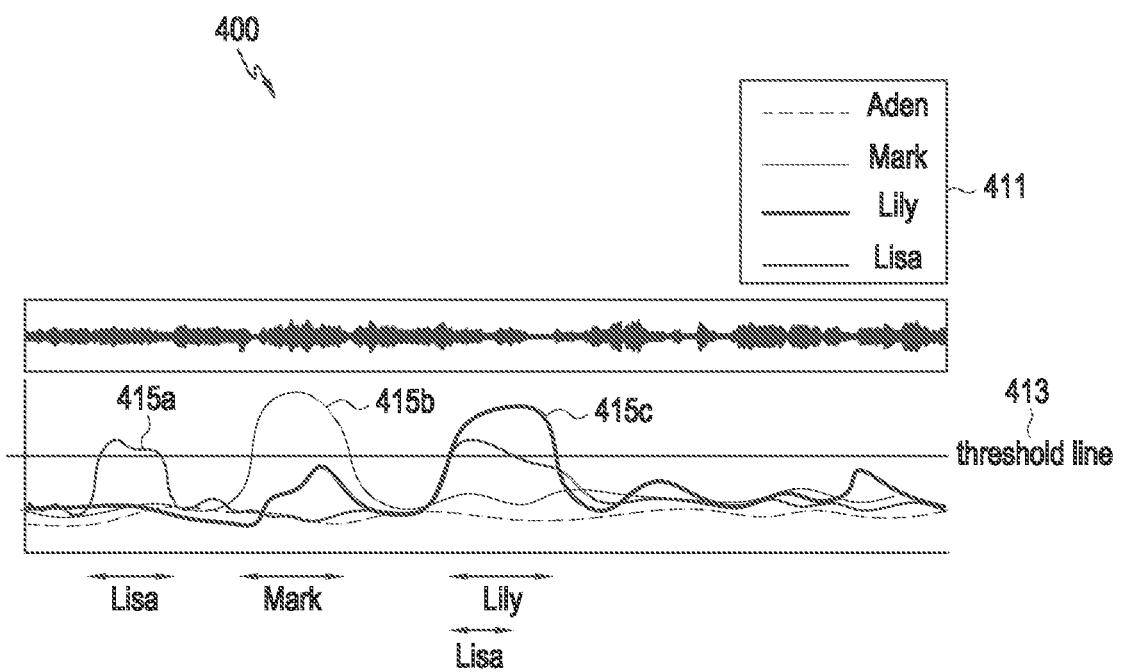
FIG. 4 is a diagram illustrating an operation of identifying pattern information of a feature vector having a similarity equal to or greater than a certain reference value in an electronic device according to an embodiment.

FIG. 4 is a diagram 400 illustrating an operation of identifying pattern information of a feature vector having a similarity degree equal to or greater than a certain reference value in an electronic device according to an embodiment.

FIG. 4 shows a graph for comparing similarity between pattern information of a feature vector detected based on speech data received during content generation with pattern information of a feature vector matching with user information 411 stored in a speech pattern DB (e.g., the speech pattern DB 231 of FIG. 2 or the speech pattern DB 331 of FIG. 3).

Referring to FIG. 4, an electronic device (e.g., the electronic device 101 of FIG. 1 or the electronic device 201 of FIG. 2) may detect a feature vector for each unit time from a start point to an end point of content generation, may identify, based on the detected feature vectors, pattern information of the feature vectors, and may determine, as tag information, the user information 411 matching with pattern information of a first feature vector, in which a similarity to the identified pattern information 415a, 415b, and 415c of the feature vectors is equal to or greater than a certain reference value 413 (e.g., a threshold value), in pattern information of the feature vector stored in the speech pattern DB 331.

If the identified pattern information 415a, 415b, and 415c of the feature vectors has the similarity to the pattern information of the first feature vector, the similarity being maintained equal to or greater than the certain reference value for a certain time, the electronic device may determine, as the user information 411, user information matching with the pattern information of the first feature vector.

Figure 5:
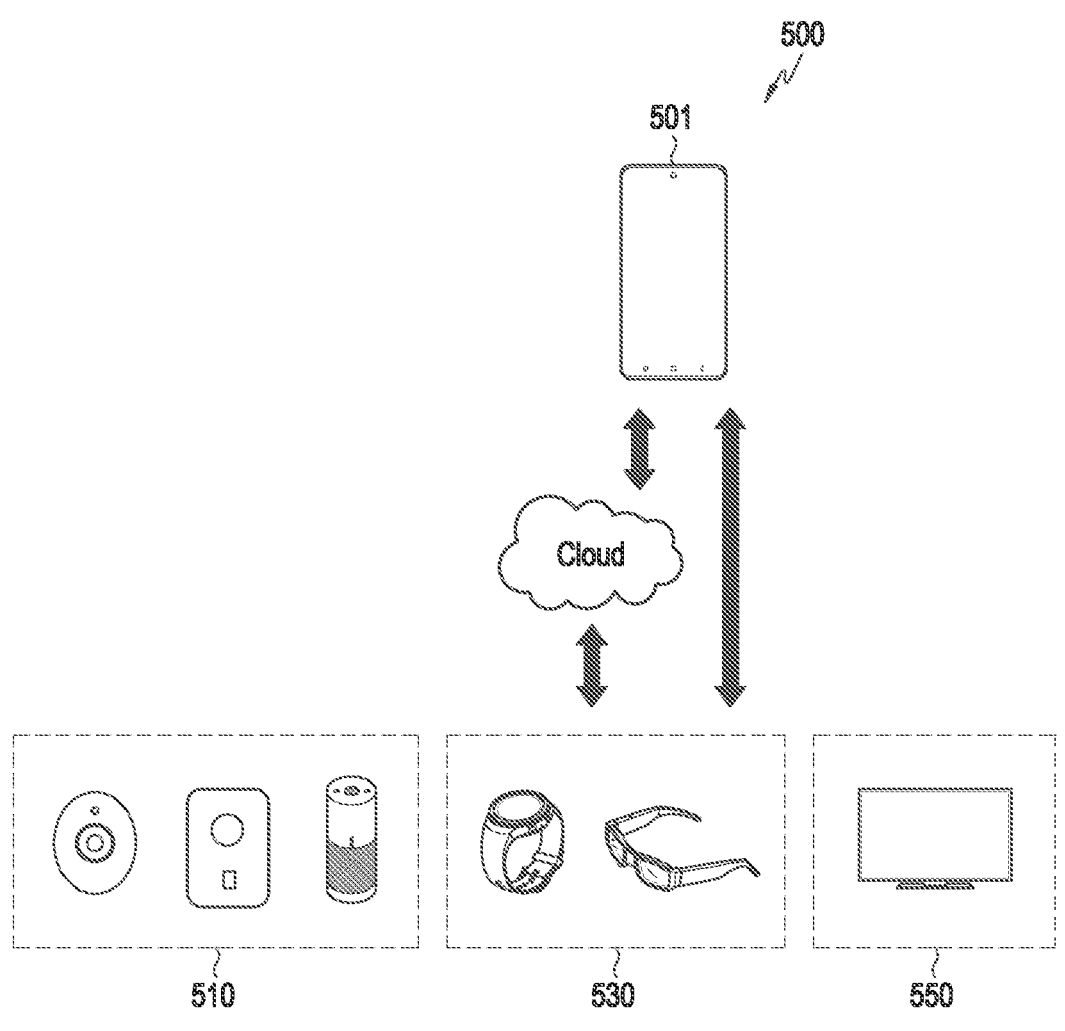
FIG. 5 is a diagram illustrating an operation of sharing a speech pattern database (DB) with an external electronic device in an electronic device according to an embodiment.

FIG. 5 is a diagram 500 illustrating an operation of sharing a speech pattern DB with an external electronic device in an electronic device according to an embodiment.

Referring to FIG. 5, an electronic device 501 (e.g., the electronic device 101 of FIG. 1 or the electronic device 201 of FIG. 2) may transmit at least a part of a speech pattern DB (e.g., the speech pattern DB 231 of FIG. 2 or the speech pattern DB 331 of FIG. 3) of the electronic device to at least one IoT electronic device 510 (e.g., an IoT camera, a smart doorbell, and an artificial intelligence (AI) speaker) of at least one external electronic device connected via a cloud, or may receive a speech pattern DB of the at least one IoT electronic device 510 from the at least one IoT electronic device 510.

The electronic device 501 may transmit at least a part of the speech pattern DB (e.g., the speech pattern DB 231 of FIG. 2 or the speech pattern DB 331 of FIG. 3) of the electronic device to at least one wearable electronic device 530 (e.g., a smart watch and AR classes) that is at least one external electronic device communication-connected to the electronic device, or may receive a speech pattern DB of the at least one wearable electronic device 530 from the at least one wearable electronic device 530.

The electronic device 501 may transmit at least a part of the speech pattern DB (e.g., the speech pattern DB 231 of FIG. 2 or the speech pattern DB 331 of FIG. 3) of the electronic device to at least one home appliance 550 (e.g., a TV) that is at least one external electronic device communication-connected to the electronic device, or may receive a speech pattern DB of the at least one home appliance 550 from the at least one home appliance 550.

FIG. 6A, FIG. 6B, FIG. 6C, and FIG. 6D are diagrams 600a to 600d respectively illustrating operations of displaying user information stored as tag information in content in an electronic device according to an embodiment.

Figure 6A:
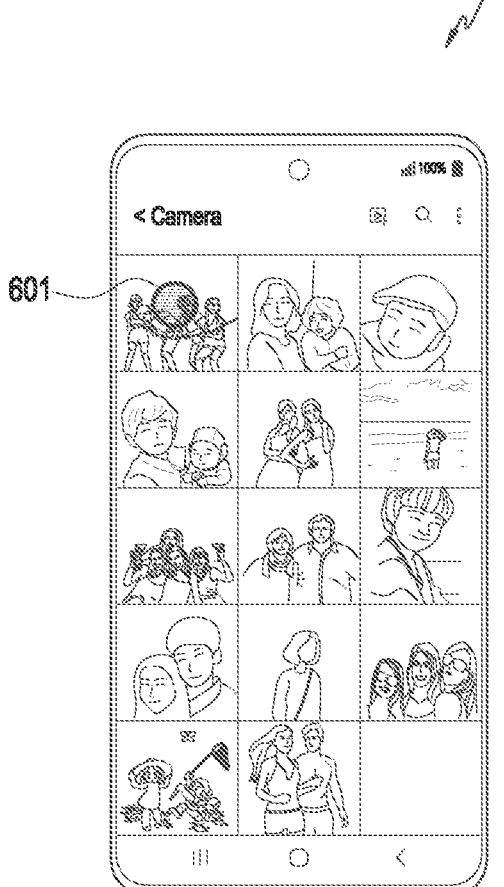
FIG. 6A, FIG. 6B, FIG. 6C, and FIG. 6D are diagrams illustrating operations of displaying user information stored as tag information in content in an electronic device according to an embodiment.

As shown in FIG. 6A, while displaying multiple contents (e.g., photos or/and videos) in a gallery application, an electronic device (e.g., the electronic device 101 of FIG. 1 or the electronic device 201 of FIG. 2) may identify a first content 601 selected by a user.

Figure 6B:
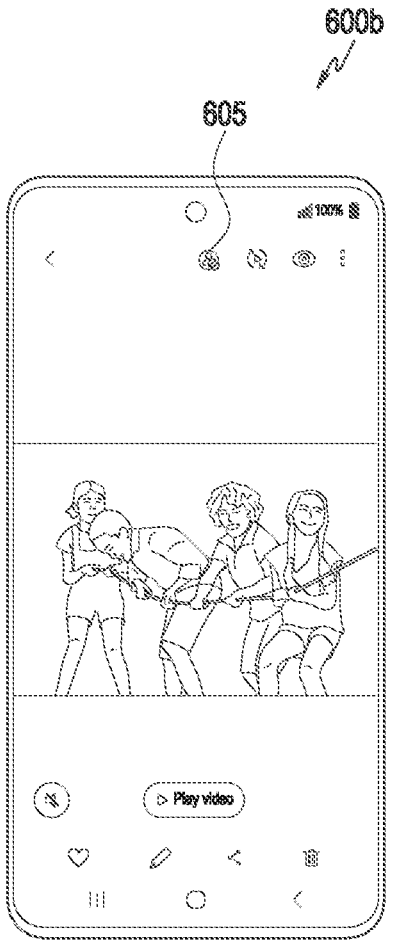

As shown in FIG. 6B, the electronic device may display the first content 601 (e.g., a video) selected by the user. The electronic device may identify whether user information (e.g., person tag information) is stored as tag information in the first content 601, and may display, while displaying the first content 601, an indicator 605 indicating that the user information has been stored as tag information in a partial area of a display (e.g., the display 260 of FIG. 2). The electronic device may display, as the indicator, an emoticon informative of user information or a face image of the user, which is matched and stored in a speech pattern DB (e.g., the speech pattern DB 231 of FIG. 2 or the speech pattern DB 331 of FIG. 3). The electronic device may include numeric information indicating the number of pieces of user information in the indicator indicating that the user information is stored as tag information.

Figure 6C:
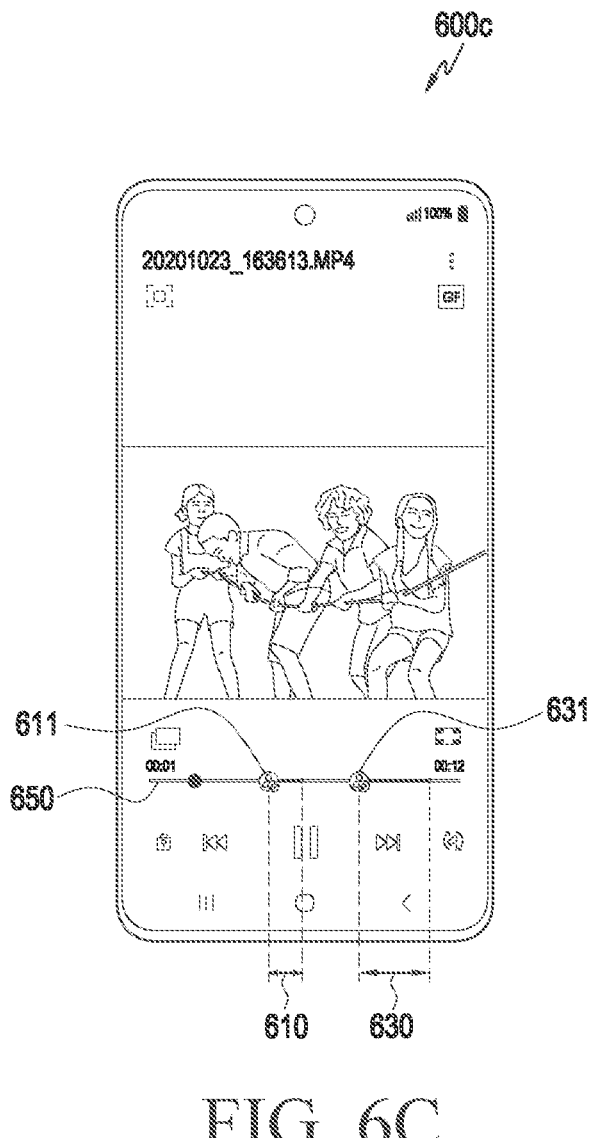

As shown in FIG. 6C, when reproduction of the first content 601 is selected, the electronic device may display, while displaying reproduction of the first content, a first speech data output section 610, in which first user information is stored as tag information, and a second speech data output section 630, in which second user information is stored as tag information, in a distinguished manner on a playback bar 650 that is a partial area of the display (e.g., the display 260 of FIG. 2). The electronic device may display, on the playback bar 650, the indicator 611 indicating that the first user information has been stored as tag information in the first speech data output section 610, and may display an indicator 631 indicating that the second user information has been stored as tag information in the second speech data output section 630.

Figure 6D:
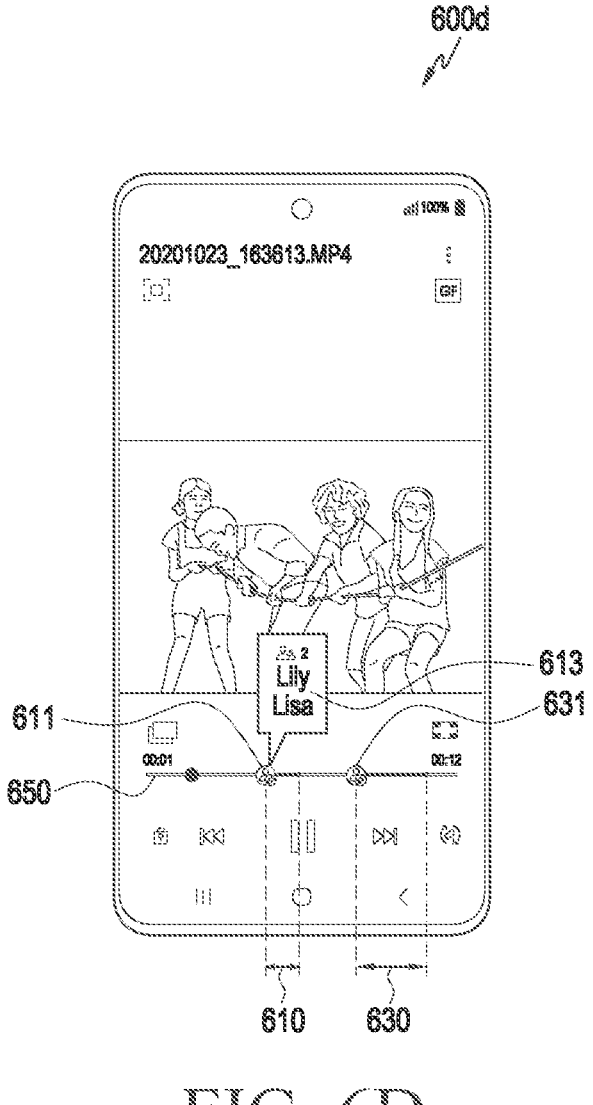

As shown in FIG. 6D, while displaying, on the playback bar 650, the indicator 611 indicating that the first user information has been stored as tag information in the first speech data output section 610, the electronic device may display, around the indicator 611, first user information 613 (e.g., names of two users) stored in the speech pattern DB.

Figure 7A:
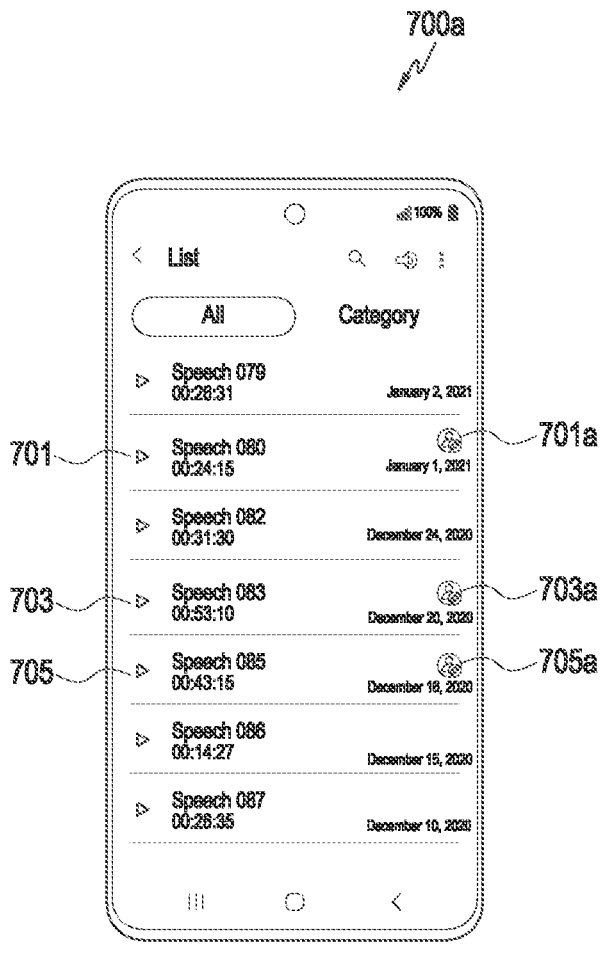
FIG. 7A and FIG. 7B are diagrams illustrating operations of displaying user information stored as tag information in content in an electronic device according to an embodiment.
Figure 7B:
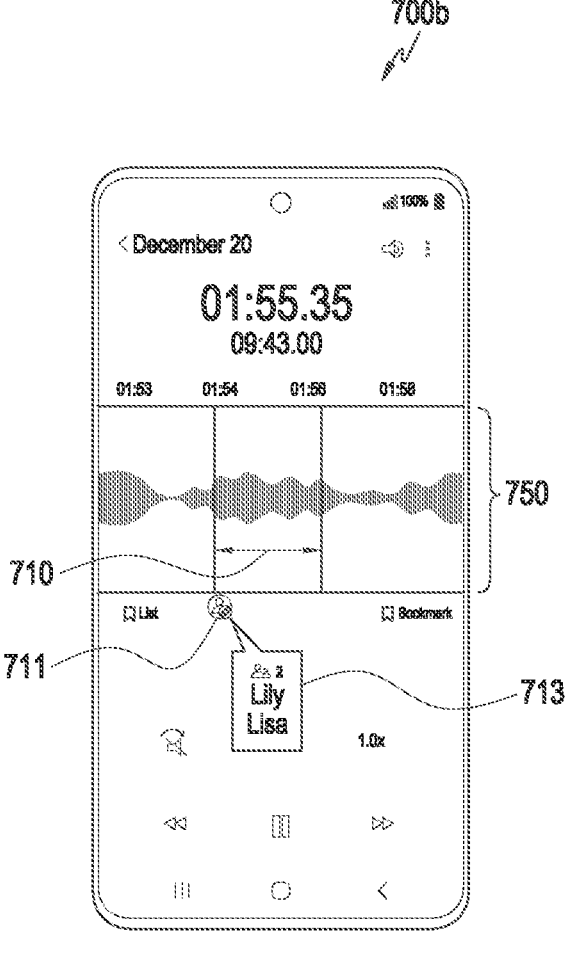

FIG. 7A and FIG. 7B are diagrams 700a and 700b illustrating operations of displaying user information stored as tag information in content in an electronic device according to an embodiment.

As shown in FIG. 7A, an electronic device (e.g., the electronic device 101 of FIG. 1 or the electronic device 201 of FIG. 2) may identify, while displaying multiple contents (e.g., speech recording files) on a speech recording application, multiple contents 701, 703, and 705 in which user information (e.g., person tag information) is stored as tag information from among the multiple contents, and may display indicators 701a, 703a, and 705a indicating that user information is stored as tag information in the multiple contents 701, 703, and 705.

As shown in FIG. 7B, when selection of the first content 701 is identified among the multiple contents 701, 703, and 705, the electronic device may display the first speech data output section 710, in which first user information is stored as tag information, on a speech recording output bar 750 in a distinguished manner, and may display an indicator 711 indicating that the first user information has been stored as tag information in the first speech data output section 710. While displaying, on the speech recording output bar 750, the indicator 711 indicating that the first user information has been stored as tag information in the first speech data output section 710, the electronic device may display, around the indicator 711, the first user information 713 (e.g., names of two users) stored in the speech pattern DB.

Figure 8:
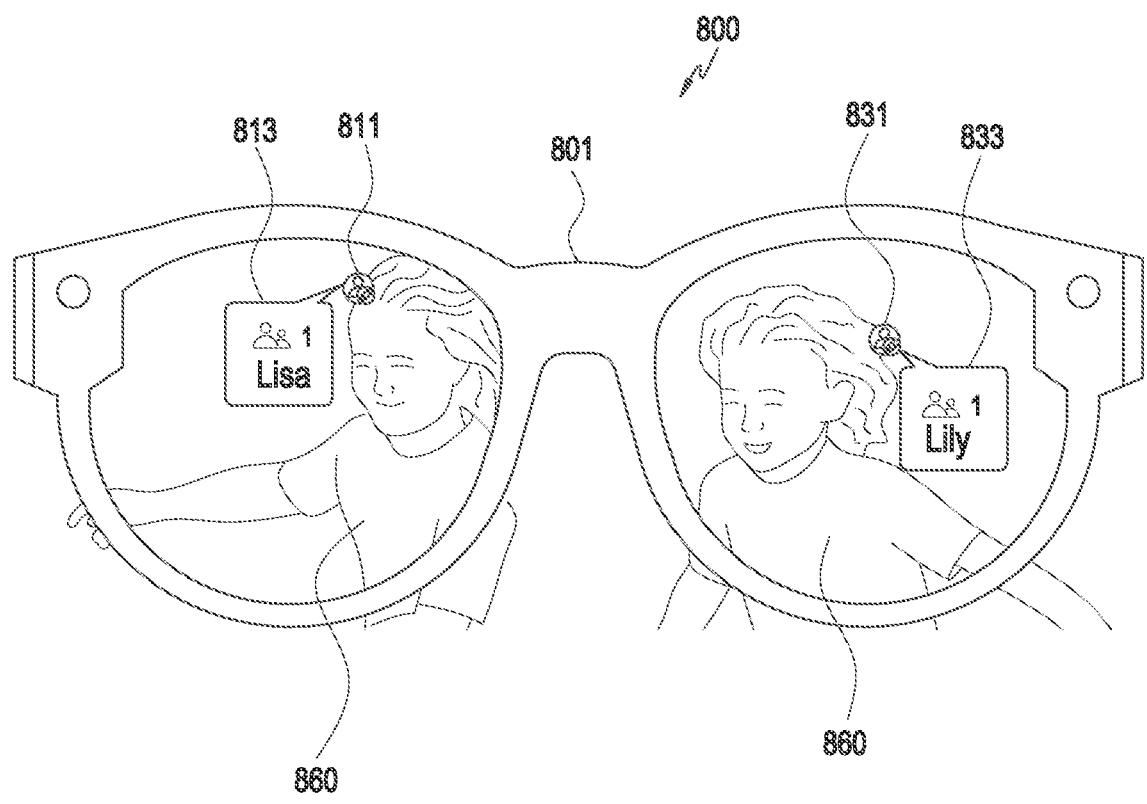
FIG. 8 is a diagram illustrating an operation of displaying user information stored as tag information in content in an electronic device according to an embodiment.

FIG. 8 is a diagram 800 illustrating an operation of displaying user information stored as tag information in content in an electronic device according to an embodiment.

Referring to FIG. 8, an electronic device 801 (e.g., the electronic device 101 of FIG. 1 and the electronic device 201 of FIG. 2) which is augmented reality (AR) glasses may identify, while displaying content via a display 860 of the electronic device, face image information of a person via the content and may identify speech data received via a microphone of the electronic device. The electronic device 801 may identify user information matching with the identified face image information and speech data of the person in a speech pattern DB (e.g., the speech pattern DB 231 of FIG. 2 or the speech pattern DB 331 of FIG. 3). The electronic device may display first user information 813 (e.g., a name of a first user) stored in the speech pattern DB and an indicator 811 indicating that user information has been stored as tag information, around a first person face image on the display 860, and may display, around a second person face image, second user information 833 (e.g., a name of a second user) stored in the speech pattern DB and an indicator 831 indicating that user information has been stored as tag information.

Figure 9:
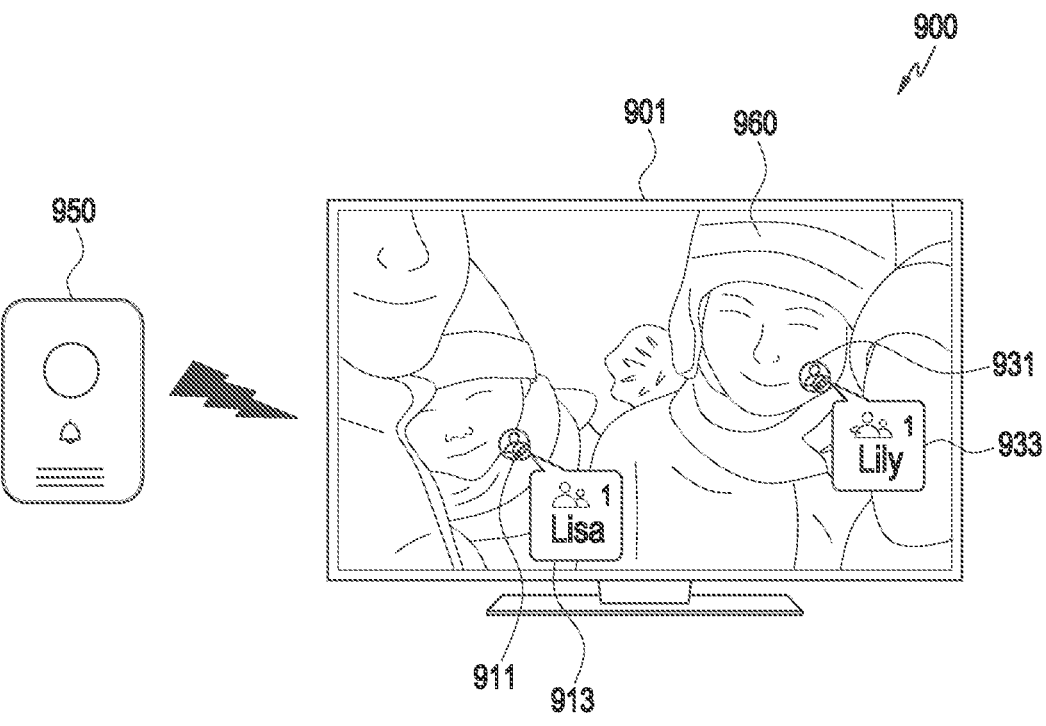
FIG. 9 is a diagram illustrating an operation of displaying user information stored as tag information in content in an electronic device according to an embodiment.

FIG. 9 is a diagram 900 illustrating an operation of displaying user information stored as tag information in content in an electronic device according to an embodiment.

Referring to FIG. 9, an electronic device 901 (e.g., the electronic device 101 of FIG. 1 or the electronic device 201 of FIG. 2) which is a TV device may display content received via a communication-connected IoT smart doorbell 950 on a display 960. The electronic device may identify, while displaying the content via the display 960, speech data received via the doorbell 950 and face image information of a person via the content. The electronic device 801 may identify user information matching with the identified face image information and speech data of the person in a speech pattern DB (e.g., the speech pattern DB 231 of FIG. 2 or the speech pattern DB 331 of FIG. 3). The electronic device may display first user information 913 (e.g., a name of a first user) stored in the speech pattern DB and an indicator 911 indicating that user information has been stored as tag information, around a first person face image on the display 960, and may display, around a second person face image, second user information 933 (e.g., a name of a second user) stored in the speech pattern DB and an indicator 931 indicating that user information has been stored as tag information.

According to an embodiment, an electronic device (e.g., the electronic device 201 of FIG. 2) may include a memory (e.g., the memory 230 of FIG. 2), a display (e.g., the display 260 of FIG. 2), and a processor (e.g., the processor 220 of FIG. 2) operatively connected to the memory and the display, wherein the processor is configured to collect speech data, match the collected speech data and user information related to the collected speech data, store, in the memory, association information between the collected speech data and the user information, detect, when generating content, speech data of the content that is input during generation of the content, and obtain user information matching with the detected speech data of the content from the memory, store the user information matching with the detected speech data of the content, as tag information of the content.

According to an embodiment, the processor may be configured to store the collected speech data and the user information related to the collected speech data in a speech pattern DB of the memory, or store, in the speech pattern DB of the memory, index information enabling detection of the user information stored related to the collected speech data in a contact information DB of the memory and the collected speech data.

According to an embodiment, the processor may be determine, based on a feature vector detected from the collected speech data, pattern information of the feature vector, match the determined pattern information of the feature vector and the user information related to the collected speech data and, store the pattern information of the feature vector matched to the user information related to the collected speech data in the memory.

According to an embodiment, the processor may be configured to, when collecting the speech data during a call, identify, based on contact information, information of a counterpart making the call, and determine the identified counterpart information as the user information related to the collected speech data.

According to an embodiment, the processor may be configured to, when collecting the speech data while performing speech recording, determine contact information, which is input by a user, as the user information related to the collected speech data.

According to an embodiment, the processor may be configured to share the speech pattern DB of the memory, which stores the speech data and the user information matching with the speech data, with at least one external electronic device related to the electronic device.

According to an embodiment, the processor may be configured to, when the speech data is received while generating the content, identify, based on a feature vector detected based on the received speech data, pattern information of the feature vector, and if pattern information of a first feature vector, in which a similarity to the identified pattern information of the feature vector is equal to or greater than a certain reference value, exists in the speech pattern DB, obtain user information matching with the pattern information of the first feature vector, store the obtained user information matching with the pattern information of the first feature vector as tag information of a section in the content, where the speech data is received.

According to an embodiment, the processor may be configured to, if the pattern information of the first feature vector, in which the similarity to the identified pattern information of the feature vector is equal to or greater than the certain reference value, does not exist in the memory, receive a speech pattern DB from at least one external electronic device related to the electronic device, wherein the received speech pattern DB includes the pattern information of the first feature vector and the user information matching with the pattern information of the first feature vector.

According to an embodiment, the processor may be configured to store the user information matching with the pattern information of the first feature vector, as tag information of a section in the content, where the speech data is received.

According to an embodiment, the processor may be configured to, if the tag information exists in a section in which the speech data of the content is output while the content is being reproduced, display the user information matching with the detected speech data of the content stored as the tag information in the section.

FIG. 10 is a flowchart 1000 illustrating an operation of storing tag information of content in an electronic device according to an embodiment. Generating the tag information of the content may include operation 1001 to operation 1003, and may be understood to be performed by a processor (e.g., the processor 120 of FIG. 1 or the processor 220 of FIG. 2) of the electronic device (e.g., the electronic device 101 of FIG. 1 or the electronic device 201 of FIG. 2). According to an embodiment, at least one of operation 1001 to operation 1003 may be omitted, a sequence of some operations may be changed, or another operation may be added.

In operation 1001, the electronic device (e.g., the electronic device 101 of FIG. 1 or the electronic device 201 of FIG. 2) may match pattern information of a feature vector determined based on speech data and user information related to the speech data, and store association information between the speech data and the user information in a speech pattern DB (e.g., the speech pattern DB 231 of FIG. 2).

According to an embodiment, the electronic device may collect speech data in frames of a certain unit for a certain time, and when a certain amount of speech data is collected, a feature vector may be detected from the collected certain amount of speech data so that a certain amount or more of feature vectors may be stored.

According to an embodiment, when the electronic device determines, based on the certain amount or more of the stored feature vectors, pattern information of the feature vectors, the electronic device may match the determined pattern information of the feature vectors and user information related to the collected speech data so as to store association information between the speech data and the user information in the speech pattern DB.

According to an embodiment, the electronic device may store the speech data and the user information matching with the speech data in the speech pattern DB of the memory.

According to an embodiment, the electronic device may store, in the speech pattern DB, index information enabling detection of the user information stored in a contact information DB (e.g., the contact information DB 233 of FIG. 2) and the speech data.

In operation 1003, the electronic device (e.g., the electronic device 101 of FIG. 1 or the electronic device 201 of FIG. 2) may detect, in the speech pattern DB (e.g., the speech pattern DB 231 of FIG. 2), user information matching with speech data received while generating content, so as to store the user information as tag information of the content.

According to an embodiment, the electronic device may collect data input to a microphone of the electronic device while generating the content.

According to an embodiment, the electronic device may detect a certain amount or more of feature vectors from speech data received in a certain time unit during generation of the content so as to store the same. The electronic device may detect respective dimension-specific (e.g., frequency band-specific) statistical values of the certain amount or more of the stored feature vectors, and may identify the detected statistical values as pattern information of the feature vectors. The statistical values may include a mean and/or a variance.

According to an embodiment, the electronic device may identify the pattern information of the feature vectors, based on the certain amount or more of the stored feature vectors, and may identify the presence of the pattern information of a first feature vector, in which a similarity to the identified pattern information of the feature vectors is equal to or greater than a certain reference value, in the pattern information of the feature vectors stored in the speech pattern DB 231. The electronic device may detect user information matching with the pattern information of the first feature vector, and store the detected user information as tag information of the content.

According to an embodiment, the user information may include contact information detected from the contact information DB (e.g., the contact information DB 233 of FIG. 2) or contact information input by a user.

FIG. 11 is a flowchart 1100 illustrating an operation of matching with and storing user information, based on speech data in an electronic device according to an embodiment. Matching and storing of the user information based on the speech data may include operation 1101 to operation 1109, and may be understood to be performed by a processor (e.g., the processor 120 of FIG. 1 or the processor 220 of FIG. 2) of the electronic device (e.g., the electronic device 101 of FIG. 1 or the electronic device 201 of FIG. 2). According to an embodiment, at least one of operation 1101 to operation 1109 may be omitted, a sequence of some operations may be changed, or another operation may be added.

In operation 1101, an electronic device (e.g., the electronic device 101 of FIG. 1 or the electronic device 201 of FIG. 2) may collect speech data.

According to an embodiment, the electronic device may collect the speech data in frames of a certain unit for a certain time.

In operation 1103, the electronic device (e.g., the electronic device 101 of FIG. 1 or the electronic device 201 of FIG. 2) may detect a certain amount or more of feature vectors from the speech data collected in units of certain frames and store the same.

According to an embodiment, the feature vector may include a feature vector indicating timbre information and a feature vector indicating pitch information. For example, the feature vector indicating timbre information may include MelSpectrogram or mel-frequency cepstral coefficients (MFCC). For example, the feature vector indicating pitch information may include a chroma feature.

In operation 1105, the electronic device (e.g., the electronic device 101 of FIG. 1 or the electronic device 201 of FIG. 2) may determine pattern information of the feature vectors, based on the certain amount or more of the stored feature vectors.

According to an embodiment, the electronic device may generate a model capable of learning a pattern of the feature vectors, based on the certain amount or more of the stored feature vectors.

According to an embodiment, the electronic device may generate a model using a neural network and a model using a statistical distribution, and may input the pattern information of the feature vectors to the models for training. For example, the model using a statistical distribution may include a Gaussian mixture model-universal background model (GMM-UBM). According to an embodiment, the electronic device may determine a confidence level for the pattern information of the feature vectors according to the distribution of the certain amount or more of the stored feature vectors. When the distribution of the certain amount or more of the stored feature vectors is close to a normal distribution, the electronic device may configure a confidence level value to be a certain value or greater, and if the distribution of the certain amount or more of the stored feature vectors is not close to the normal distribution, the electronic device may configure the confidence level value to be equal to or smaller than a certain value.

According to an embodiment, for the pattern information of the feature vectors, in which the confidence level value is configured to be equal to or smaller than the certain value, in the speech pattern DB (e.g., the speech pattern DB 231 of FIG. 2) of the memory (e.g., the memory 230 of FIG. 2), if a confidence level value for new pattern information of feature vectors having the same user information is determined to be a value equal to or greater than the certain value, the electronic device may delete the existing pattern information of the feature vectors and confidence level value from the speech pattern DB 231, and may perform updating with the new pattern information of the feature vectors and confidence level value.

According to an embodiment, if the distribution of the certain amount or more of the stored feature vectors is equal to or higher than a certain level close to the normal distribution, the electronic device may store the pattern information of the feature vectors in the speech pattern DB, and if the distribution of the certain amount or more of the stored feature vectors is equal to or lower than the certain level that is not close to the normal distribution, the electronic device may not store the pattern information of the feature vectors in the speech pattern DB 231.

In operation 1107, the electronic device (e.g., the electronic device 101 of FIG. 1 or the electronic device 201 of FIG. 2) may identify user information related to the speech data.

According to an embodiment, the electronic device may identify, as the user information, contact information detected in the contact information DB (e.g., the contact information DB 233 of FIG. 2) or contact information input by the user.

In operation 1109, the electronic device (e.g., the electronic device 101 of FIG. 1 or the electronic device 201 of FIG. 2) may match the pattern information of the feature vector and the user information so as to store the same in the speech pattern DB.

Figure 12:
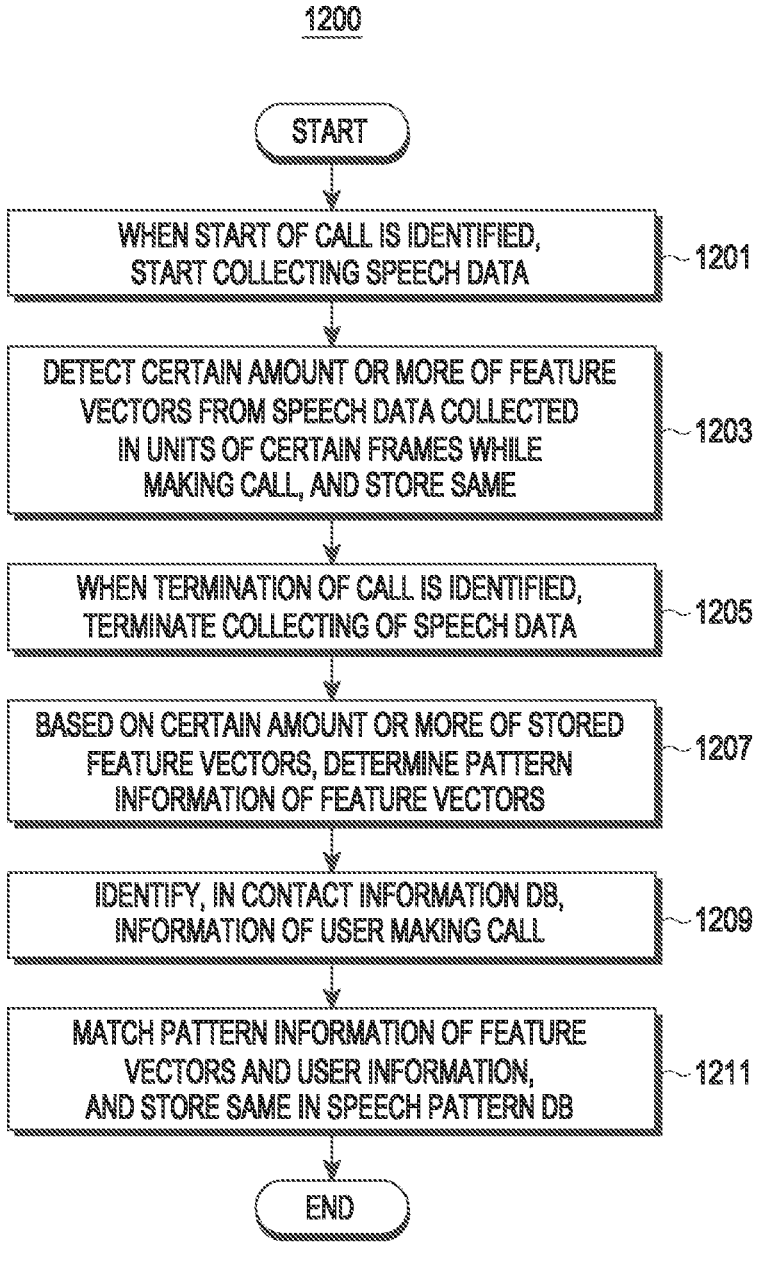
FIG. 12 is a flowchart illustrating an operation of collecting speech data while making a call in an electronic device according to an embodiment.

FIG. 12 is a flowchart 1200 illustrating an operation of collecting speech data while making a call in an electronic device according to an embodiment. Collecting the speech data while making a call may include operation 1201 to operation 1211, and may be understood to be performed by a processor (e.g., the processor 120 of FIG. 1 or the processor 220 of FIG. 2) of the electronic device (e.g., the electronic device 101 of FIG. 1 or the electronic device 201 of FIG. 2). According to an embodiment, at least one of operation 1201 to operation 1211 may be omitted, a sequence of some operations may be changed, or another operation may be added.

In operation 1201, an electronic device (e.g., the electronic device 101 of FIG. 1 or the electronic device 201 of FIG. 2) may start collecting speech data when a start of a call is identified.

In operation 1203, the electronic device (e.g., the electronic device 101 of FIG. 1 or the electronic device 201 of FIG. 2) may detect a certain amount or more of feature vectors in the speech data collected in units of certain frames during the call.

According to an embodiment, when the speech data is collected during the call, the electronic device may collect the data while changing at least one of a buffer size or/and a data request period according to a call environment or a call type.

According to an embodiment, when collecting the speech data during the call, since the collected speech data has different characteristics depending on a call type, the electronic device may perform preprocessing differently for each codec so that all data may have the same characteristics.

In operation 1205, the electronic device (e.g., the electronic device 101 of FIG. 1 or the electronic device 201 of FIG. 2) may terminate collecting of the speech data when termination of the call is identified.

In operation 1207, the electronic device (e.g., the electronic device 101 of FIG. 1 or the electronic device 201 of FIG. 2) may determine pattern information of the feature vectors, based on the certain amount or more of the stored feature vectors.

In operation 1209, the electronic device (e.g., the electronic device 101 of FIG. 1 or the electronic device 201 of FIG. 2) may identify information of the user having made a call in the contact information DB (e.g., the contact information DB 233 of FIG. 2).

According to an embodiment, when the pattern information of the feature vectors is determined based on the speech data collected during the call, the electronic device may identify information of a counterpart (e.g., corresponding/correlated information) having made the call, based on contact information stored in the contact information DB, and may identify the identified counterpart information to be the user information related to the speech data.

In operation 1211, the electronic device (e.g., the electronic device 101 of FIG. 1 or the electronic device 201 of FIG. 2) may match the pattern information of the feature vectors and the user information so as to store the same in the speech pattern DB (e.g., the speech pattern DB 231 of FIG. 2).

FIG. 13 is a flowchart 1300 illustrating an operation of collecting speech data for performing speech recording in an electronic device according to an embodiment. Collecting of the speech data while making a call may include operation 1301 to operation 1311, and may be understood to be performed by a processor (e.g., the processor 130 of FIG. 1 or the processor 220 of FIG. 2) of the electronic device (e.g., the electronic device 101 of FIG. 1 or the electronic device 201 of FIG. 2). According to an embodiment, at least one of operation 1301 to operation 1311 may be omitted, a sequence of some operations may be changed, or another operation may be added.

In operation 1301, the electronic device (e.g., the electronic device 101 of FIG. 1 or the electronic device 201 of FIG. 2) may start collecting speech data when a start of speech recording is identified.

In operation 1303, the electronic device (e.g., the electronic device 101 of FIG. 1 or the electronic device 201 of FIG. 2) may detect a certain amount or more of feature vectors in the speech data collected in units of certain frames during speech recording so as to store the same.

In operation 1305, the electronic device (e.g., the electronic device 101 of FIG. 1 or the electronic device 201 of FIG. 2) may terminate collecting of the speech data when termination of speech recording is identified.

In operation 1307, the electronic device (e.g., the electronic device 101 of FIG. 1 or the electronic device 201 of FIG. 2) may determine pattern information of the feature vectors, based on the certain amount or more of the stored feature vectors.

In operation 1309, the electronic device (e.g., the electronic device 101 of FIG. 1 or the electronic device 201 of FIG. 2) may identify, as user information, contact information input by a user.

In operation 1311, the electronic device (e.g., the electronic device 101 of FIG. 1 or the electronic device 201 of FIG. 2) may match the pattern information of the feature vectors and the user information so as to store the same in a speech pattern DB (e.g., the speech pattern DB 231 of FIG. 2).

FIG. 14 is a flowchart 1400 illustrating an operation of generating tag information of content in an electronic device according to an embodiment. Generating the tag information of the content may include operation 1401 to operation 1409, and may be understood to be performed by a processor (e.g., the processor 120 of FIG. 1 or the processor 220 of FIG. 2) of the electronic device (e.g., the electronic device 101 of FIG. 1 or the electronic device 201 of FIG. 2). According to an embodiment, at least one of operation 1401 to operation 1409 may be omitted, a sequence of some operations may be changed, or another operation may be added.

In operation 1401, an electronic device (e.g., the electronic device 101 of FIG. 1 or the electronic device 201 of FIG. 2) may start content generation.

In operation 1403, the electronic device (e.g., the electronic device 101 of FIG. 1 or the electronic device 201 of FIG. 2) may detect a certain amount or more of feature vectors in the speech data collected a certain time unit during generation of content.

According to an embodiment, the electronic device may collect data input to a microphone of the electronic device while generating the content.

According to an embodiment, the electronic device may detect the certain amount or more of feature vectors in the speech data received in a certain time unit during generation of the content, so as to store the same.

In operation 1405, the electronic device (e.g., the electronic device 101 of FIG. 1 or the electronic device 201 of FIG. 2) may identify the pattern information of the feature vector, based on the certain amount or more of the stored feature vectors.

In operation 1407, the electronic device (e.g., the electronic device 101 of FIG. 1 or the electronic device 201 of FIG. 2) may identify whether pattern information of a first feature vector corresponding to the identified pattern information of the feature vectors exists in the speech pattern DB.

According to an embodiment, the electronic device may identify the presence of the pattern information of the first feature vector, in which a similarity to the identified pattern information of the feature vectors is equal to or greater than a certain reference value, in the pattern information of the feature vectors stored in the speech pattern DB.

According to an embodiment, the electronic device may determine a confidence level of the identified pattern information of the feature vectors, based on the distribution of the certain amount or more of the stored feature vectors, and if the confidence level is equal to or higher than a certain level, the electronic device may identify whether the pattern information of the first feature vector, in which the similarity to the identified pattern information of the feature vectors is equal to or greater than the certain reference value, exists in the speech pattern DB.

According to an embodiment, if the pattern information of the first feature vector, in which the similarity to the identified pattern information of the feature vectors is equal to or greater than the certain reference value, does not exist in the speech pattern DB 231, the electronic device may request a speech pattern DB from at least one external electronic device related to the electronic device. For example, the electronic device may request a speech pattern DB from at least one external electronic device existing on the same network as the electronic device 201 or at least one external electronic device registered with the same account as the electronic device. The electronic device may identify whether the pattern information of the first feature vector, in which the similarity to the identified pattern information of the feature vectors is equal to or greater than the certain reference value, exists in the speech pattern DB received from the at least one external electronic device.

According to an embodiment, the pattern information of the first feature vector, in which the similarity to the identified pattern information of the feature vectors is equal to or greater than the certain reference value, exists in the speech pattern DB 231, but if a confidence level value of the pattern information of the first feature vector is equal to or smaller than the certain value, the electronic device may request a speech pattern DB from at least one external electronic device related to the electronic device. If the confidence level value of the pattern information of the first feature vector is identified to be equal to or greater than the certain value in the speech pattern DB received from the at least one external electronic device, the electronic device may update the speech pattern DB of the electronic device, based on the speech pattern DB received from the at least one external electronic device.

In operation 1409, the electronic device (e.g., the electronic device 101 of FIG. 1 or the electronic device 201 of FIG. 2) may store user information matching with the pattern information of the first feature vector, as tag information of the content.

According to an embodiment, the electronic device may input the pattern information of the feature vectors to a model using a neural network and a model using a statistical distribution, so as to detect user information matching with the pattern information of the first feature vector in the speech pattern DB. If results of the model using the neural network and the model using the statistical distribution are different, the electronic device may determine a result by adding a weight to the result of the model using the neural network.

According to an embodiment, the electronic device may store the user information matching with the pattern information of the first feature vector, as tag information of a section in the content, where the speech data is received.

According to an embodiment, if the identified pattern information of the feature vectors has the similarity to the pattern information of the first feature vector, the similarity being maintained equal to or greater than the certain reference value, the electronic device may detect user information matching with the pattern information of the first feature vector in the speech pattern DB, and may store the detected user information as tag information of the content.

Figure 15:
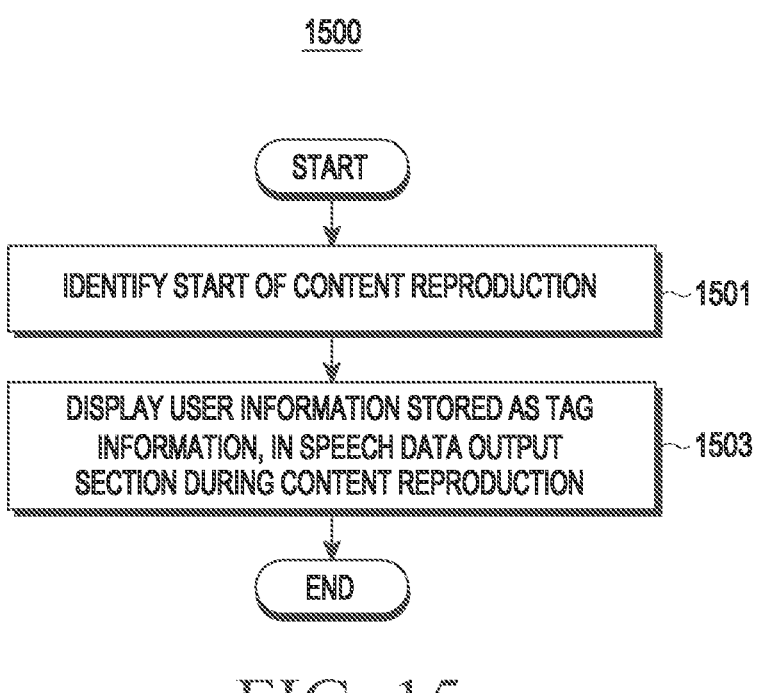
FIG. 15 is a flowchart illustrating an operation of reproducing content in an electronic device according to an embodiment.

FIG. 15 is a flowchart 1500 illustrating an operation of reproducing content in an electronic device according to an embodiment. Generating of reproduction information of the content may include operation 1501 to operation 1503, and may be understood to be performed by a processor (e.g., the processor 120 of FIG. 1 or the processor 220 of FIG. 2) of the electronic device (e.g., the electronic device 101 of FIG. 1 or the electronic device 201 of FIG. 2). According to an embodiment, at least one of operation 1501 to operation 1503 may be omitted, a sequence of some operations may be changed, or another operation may be added.

In operation 1501, an electronic device (e.g., the electronic device 101 of FIG. 1 or the electronic device 201 of FIG. 2) may identify a start of content reproduction.

In operation 1503, the electronic device (e.g., the electronic device 101 of FIG. 1 or the electronic device 201 of FIG. 2) may display user information, which is stored as tag information, in a speech data output section while reproducing content.

According to an embodiment, when the user information being stored as tag information in the content is identified, the electronic device may display the speech data output section, in which the user information is stored as tag information, in a distinguished manner on a playback bar (e.g., the playback bar 650 in FIG. 6C) which is a partial area of a display (e.g., the display 260 of FIG. 2). The electronic device may display an indicator indicating that the user information has been stored as tag information in the speech data output section on the playback bar.

A method for storing tag information of content in an electronic device according to an embodiment may include collecting speech data, matching (with the collected speech data) user information related to the collected speech data so as to store the same in a memory of the electronic device, detecting, when generating content, speech data of the content that is input during generation of the content, and obtaining user information matching with the detected speech data of the content from the memory, storing the user information matching with the detected speech data of the content, as tag information of the content.

According to an embodiment, the method may further include storing the collected speech data and the user information related to the collected speech data in a speech pattern DB of the memory, or storing, in the speech pattern DB of the memory, index information enabling detection of the user information stored related to the collected speech data in a contact information DB of the memory and the collected speech data.

According to an embodiment, the storing in the memory may further include detecting a feature vector from the collected speech data, determining, based on the detected feature vector, pattern information of the feature vector, matching the determined pattern information of the feature vector and the user information related to the collected speech data, and storing the pattern information of the feature vector matched to the user information in the memory.

According to an embodiment, the method may further include, when collecting the speech data during a call, identifying, based on contact information, information of a counterpart making the call, and determining the identified counterpart information as the user information related to the collected speech data.

According to an embodiment, the method may further include, when collecting the speech data while performing speech recording, determining contact information, which is input by a user, as the user information related to the collected speech data.

According to an embodiment, the method may further include sharing the speech pattern DB of the memory, which stores the collected speech data and the user information matching with the collected speech data, with at least one external electronic device related to the electronic device.

According to an embodiment, the storing as the tag information of the content may further include, when the speech data is received while generating the content, detecting a feature vector based on the received speech data, identifying, based on the detected feature vector, pattern information of the feature vector, and if pattern information of a first feature vector, in which a similarity to the identified pattern information of the feature vector is equal to or greater than a certain reference value, exists in the memory, obtaining user information matching with the pattern information of the first feature vector, and storing the obtained user information matching with the pattern information of the first feature vector as tag information of the content.

According to an embodiment, the method may further include, if the pattern information of the first feature vector, in which the similarity to the identified pattern information of the feature vector is equal to or greater than the certain reference value, does not exist in the memory, receiving a speech pattern DB from at least one external electronic device related to the electronic device, wherein the received speech pattern DB includes the pattern information of the first feature vector and the user information matching with the pattern information of the first feature vector.

According to an embodiment, the method may further include storing the user information matching with the pattern information of the first feature vector, as tag information of a section in the content, where the speech data is received.

According to an embodiment, the method may further include, if the tag information exists in a section in which the speech data of the content is output while the content is being reproduced, displaying the user information matching with the detected speech data of the content stored as the tag information in the section.

An embodiment of the document may equally operate not only in electronic devices, but also in devices capable of using an optical sensor module and a stretchable display, for example, home appliances and vehicles.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to "another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

a display;

at least one processor, and memory instructions that, when executed by the at least one processor individually or collectively, cause the electronic device to:

collect speech data, match the collected speech data and user information related to the collected speech data, and store, in the memory, association information between the collected speech data and the user information;

when generating content, detect first speech data of the content that is input during generation of the content, and obtain the user information matching the detected first speech data of the content from the memory, store the user information matching with the detected first speech data of the content as tag information of the content, wherein the content comprises a video, wherein the user information corresponds to a speaker in the video having the detected first speech data; and in response to identifying that the user information is stored as the tag information in the content when reproducing the content based on a user input, display the user information stored as the tag information in a section in which the first speech data of the content is outputted while the content is being reproduced.

2. The electronic device of claim 1, wherein the instructions, when executed by the at least one processor individually or collectively, cause the electronic device to:

store the collected speech data and the user information related to the collected speech data in a speech pattern database (DB) of the memory; or store, in the speech pattern DB of the memory, index information, the index information enabling detection of the user information related to the collected speech data stored in a contact information DB of the memory and the collected speech data.

3. The electronic device of claim 1, wherein the instructions, when executed by the at least one processor individually or collectively, cause the electronic device to:

based on a feature vector detected from the collected speech data, determine pattern information of the feature vector;

match the determined pattern information of the feature vector and the user information related to the collected speech data; and store the determined pattern information of the feature vector matched with the user information related to the collected speech data in the memory.

4. The electronic device of claim 1, wherein the instructions, when executed by the at least one processor individually or collectively, cause the electronic device to:

when collecting the collected speech data during a call, identify, based on contact information, information of a counterpart making the call; and determine the identified counterpart information as the user information related to the collected speech data.

5. The electronic device of claim 1, wherein the instructions, when executed by the at least one processor individually or collectively, cause the electronic device to:

when collecting the collected speech data while performing speech recording, determine contact information, which is input by a user, as the user information related to the collected speech data.

6. The electronic device of claim 1, wherein the instructions, when executed by the at least one processor individually or collectively, cause the electronic device to:

in response to the collected speech data being received while generating the content, identify, based on a feature vector detected from the collected speech data, pattern information of the feature vector; and in response to a first pattern information of a first feature vector, having a similarity to the identified pattern information of the feature vector that is equal to or greater than a reference value, existing in the memory, obtain the user information matching with the first pattern information of the first feature vector; and store the user information matching with the first pattern information of the first feature vector as tag information of a section in the content, where the collected speech data is received.

7. The electronic device of claim 6, wherein the instructions, when executed by the at least one processor individually or collectively, cause the electronic device to:

in response to the first pattern information of the first feature vector not having in the memory the similarity to the identified pattern information of the feature vector that is equal to or greater than the reference value, receive a speech pattern DB from at least one external electronic device related to the electronic device; and wherein the received speech pattern DB includes the first pattern information of the first feature vector and the user information matching with the first pattern information of the first feature vector.

8. A method for storing tag information of content in an electronic device, the method comprising:

collecting speech data, matching the collected speech data and user information related to the collected speech data, and storing, in a memory of the electronic device, association information between the collected speech data and the user information;

when generating content, detecting first speech data of the content that is input during generation of the content, obtaining the user information matching with the detected first speech data of the content from the memory, and storing the user information matching with the detected first speech data of the content as tag information of the content, wherein the content comprises a video, wherein the user information corresponds to a speaker in the video having the detected first speech data; and in response to identifying that the user information is stored as the tag information in the content when reproducing the content based on a user input, displaying the user information stored as the tag information in a section in which the first speech data of the content is outputted while the content is being reproduced.

9. The method of claim 8, further comprising:

storing the collected speech data and the user information related to the collected speech data in a speech pattern database (DB) of the memory; or storing, in the speech pattern DB of the memory, index information, the index information enabling detection of the user information stored related to the collected speech data in a contact information DB of the memory and the collected speech data.

10. The method of claim 8, wherein the storing in the memory the association information between the collected speech data and the user information further comprises:

detecting a feature vector from the collected speech data;

based on the detected feature vector, determining pattern information of the feature vector;

matching the determined pattern information of the feature vector and the user information related to the collected speech data; and storing the determined pattern information of the feature vector matched to the user information related to the collected speech data in the memory.

11. The method of claim 8, further comprising:

when collecting the collected speech data during a call, identifying, based on contact information, information of a counterpart making the call; and determining the identified counterpart information as the user information related to the collected speech data.

12. The method of claim 8, further comprising, when collecting the collected speech data while performing speech recording, determining contact information, which is input by a user, as the user information related to the collected speech data.

13. The method of claim 8, wherein the storing as the tag information of the content comprises:

in response to the collected speech data being received while generating the content, detecting a feature vector, based on the collected speech data;

based on the detected feature vector, identifying pattern information of the feature vector;

in response to a first pattern information of a first feature vector, having a similarity to the identified pattern information of the feature vector that is equal to or greater than a reference value, existing in the memory, obtaining the user information matching with the first pattern information of the first feature vector; and storing the user information matching with the first pattern information of the first feature vector as tag information of a section in the content, where the speech data is received; and in response to the first pattern information of the first feature vector not having in the memory the similarity to the identified pattern information of the feature vector that is equal to or greater than the reference value receiving a speech pattern DB from at least one external electronic device related to the electronic device, wherein the received speech pattern DB includes the first pattern information of the first feature vector and the user information matching with the first pattern information of the first feature vector.

* * * * *